(12) United States Patent
Moore et al.

(10) Patent No.: US 9,423,946 B2
(45) Date of Patent: Aug. 23, 2016

(54) CONTEXT SENSITIVE ACTIONS IN RESPONSE TO TOUCH INPUT

(71) Applicant: Apple Inc., Cupertino, CA (US)

(72) Inventors: Christopher D. Moore, San Francisco, CA (US); Marcel Van Os, San Francisco, CA (US); Bradford A. Moore, San Francisco, CA (US); Patrick S. Piemonte, San Francisco, CA (US); Eleanor C. Wachsman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 101 days.

(21) Appl. No.: 13/964,961

(22) Filed: Aug. 12, 2013

(65) Prior Publication Data

US 2015/0046884 A1    Feb. 12, 2015

(51) Int. Cl.
*G06F 3/048* (2013.01)
*G06F 3/0485* (2013.01)
*G06F 1/16* (2006.01)
*G06F 3/0488* (2013.01)

(52) U.S. Cl.
CPC ........... *G06F 3/0485* (2013.01); *G06F 1/1694* (2013.01); *G06F 3/04883* (2013.01)

(58) Field of Classification Search
CPC . G06F 3/0481; G06F 1/1613; G01C 21/206; G01C 21/3484; G01C 21/30; G01C 21/3667
See application file for complete search history.

(56) References Cited

U.S. PATENT DOCUMENTS

| | | |
|---|---|---|
| 7,173,604 B2 | 2/2007 | Marvit |
| 7,934,156 B2 | 4/2011 | Forstall et al. |
| 8,289,292 B2 | 10/2012 | Sip |
| 8,504,947 B2 | 8/2013 | Forstall et al. |
| 8,577,971 B2 | 11/2013 | Forstall et al. |
| 8,718,797 B1 | 5/2014 | Addepalli et al. |
| 2005/0212767 A1 | 9/2005 | Marvit et al. |
| 2006/0028429 A1 | 2/2006 | Kanevsky |
| 2007/0225902 A1* | 9/2007 | Gretton ................. G01C 21/26 701/533 |
| 2008/0036743 A1 | 2/2008 | Westerman et al. |
| 2008/0094371 A1* | 4/2008 | Forstall et al. ............... 345/173 |
| 2008/0174570 A1 | 7/2008 | Jobs et al. |

(Continued)

FOREIGN PATENT DOCUMENTS

WO    WO 2012/050377 A2    4/2012

OTHER PUBLICATIONS

Office Action dated Dec. 8, 2014, received in U.S. Appl. No. 13/964,967, 18 pages.

(Continued)

*Primary Examiner* — William Bashore
*Assistant Examiner* — Rayeez Chowdhury
(74) *Attorney, Agent, or Firm* — Morgan, Lewis & Bockius LLP

(57) ABSTRACT

Techniques for performing context-sensitive actions in response to touch input are provided. A user interface of an application can be displayed. Touch input can be received in a region of the displayed user interface, and a context can be determined. A first action may be performed if the context is a first context and a second action may instead be performed if the context is a second context different from the first context. In some embodiments, an action may be performed if the context is a first context and the touch input is a first touch input, and may also be performed if the context is a second context and the touch input is a second touch input.

33 Claims, 18 Drawing Sheets

(56) References Cited

U.S. PATENT DOCUMENTS

| | | | |
|---|---|---|---|
| 2008/0243367 A1* | 10/2008 | Wako | G01C 21/367 701/432 |
| 2009/0005975 A1* | 1/2009 | Forstall | G01C 21/20 701/533 |
| 2009/0037849 A1 | 2/2009 | Immonen et al. | |
| 2009/0149155 A1* | 6/2009 | Grossman | G06Q 30/02 455/411 |
| 2009/0216434 A1* | 8/2009 | Panganiban | G01C 21/3673 701/532 |
| 2009/0319181 A1 | 12/2009 | Khosravy et al. | |
| 2010/0057344 A1* | 3/2010 | Nezu | G01C 21/367 701/533 |
| 2010/0073284 A1 | 3/2010 | Dods et al. | |
| 2010/0306714 A1 | 12/2010 | Latta et al. | |
| 2011/0154268 A1 | 6/2011 | Trent, Jr. et al. | |
| 2011/0166777 A1* | 7/2011 | Chavakula | G01C 21/3667 701/533 |
| 2011/0205163 A1* | 8/2011 | Hinckley | G06F 3/0483 345/173 |
| 2011/0210931 A1 | 9/2011 | Shai | |
| 2011/0289455 A1 | 11/2011 | Reville et al. | |
| 2012/0005632 A1 | 1/2012 | Broyles, III | |
| 2012/0013543 A1* | 1/2012 | Shenfield | G06F 3/0481 345/173 |
| 2012/0058783 A1 | 3/2012 | Kim | |
| 2012/0089952 A1 | 4/2012 | Song | |
| 2012/0119985 A1 | 5/2012 | Kang | |
| 2012/0133579 A1 | 5/2012 | Prieur et al. | |
| 2012/0191993 A1 | 7/2012 | Drader et al. | |
| 2012/0262381 A1 | 10/2012 | Hirsch et al. | |
| 2012/0304280 A1 | 11/2012 | Hayashida | |
| 2012/0313847 A1* | 12/2012 | Boda | H04M 1/72569 345/156 |
| 2013/0082974 A1 | 4/2013 | Kerr et al. | |
| 2013/0083055 A1 | 4/2013 | Piemonte et al. | |
| 2013/0194201 A1* | 8/2013 | Zanone | G06F 3/03543 345/173 |
| 2013/0194235 A1 | 8/2013 | Zanone et al. | |
| 2013/0332113 A1* | 12/2013 | Piemonte et al. | 702/189 |
| 2013/0332826 A1 | 12/2013 | Karunamuni et al. | |
| 2014/0035823 A1 | 2/2014 | Khoe et al. | |
| 2014/0191955 A1 | 7/2014 | Raffa et al. | |
| 2015/0046884 A1 | 2/2015 | Moore et al. | |

OTHER PUBLICATIONS

International Search Report and Written Opinion dated Nov. 4, 2014, received in International Patent Application No. PCT/US2014,048250, which corresponds to U.S. Appl. No. 13/964,961, 11 pages.

Notice of Allowance, dated Apr. 10, 2015, received in U.S. Appl. No. 13/964,967, 14 pages.

International Preliminary Report on Patentability, dated Feb. 16, 2016, received in International Patent Application No. PCT/US2014/048250, which corresponds to U.S. Appl. No. 13/964,961, 8 pages.

* cited by examiner

CONTEXT SENSITIVE ACTIONS IN RESPONSE TO TOUCH INPUT

CROSS-REFERENCE TO RELATED APPLICATIONS

This application is related to commonly-owned co-pending U.S. application Ser. No. 13/964,967, filed Aug. 12, 2013, entitled "Context Sensitive Actions," which issued as U.S. Pat. No. 9,110,561, the disclosure of which is incorporated by reference herein in its entirety.

BACKGROUND

The present disclosure relates generally to electronic devices and more particularly to an electronic device performing context-sensitive actions in response to touch input.

Electronic devices such as desktop computers and mobile devices (e.g., laptop computers, smart phones, tablet computers, media players, and the like) have become quite popular and play an integral role in our day-to-day lives. For instance, many users carry a mobile device almost everywhere they go and use their devices for a variety of purposes, including sending, receiving, and managing text messages and emails, viewing maps, navigation (e.g., using such maps and/or a GPS receiver), purchasing items in stores (e.g., using contactless payment systems), making and receiving phone calls, and/or accessing the Internet (e.g., to look up information). To facilitate such functionality, electronic devices typically utilize an operating system (OS) that can run various types of applications.

Many electronic devices include a touchscreen user interface that can detect physical contact from a user of the device and perform a corresponding action. Examples of such devices include the iPhone®, iPad®, iPod®, and other devices provided by Apple Inc. of Cupertino, Calif. For instance, many electronic devices can detect when a user has provided a particular gesture (e.g., using one or more of the user's fingertips) on a touchscreen user interface, such as a single-tap, double-tap, drag, swipe, pinch, flick, rotation, multi-touch gesture, and the like. Upon receiving such a gesture, an electronic device can generate an event corresponding to the gesture which may cause an application running on the device to perform a particular action.

DETAILED DESCRIPTION

Figure 1:
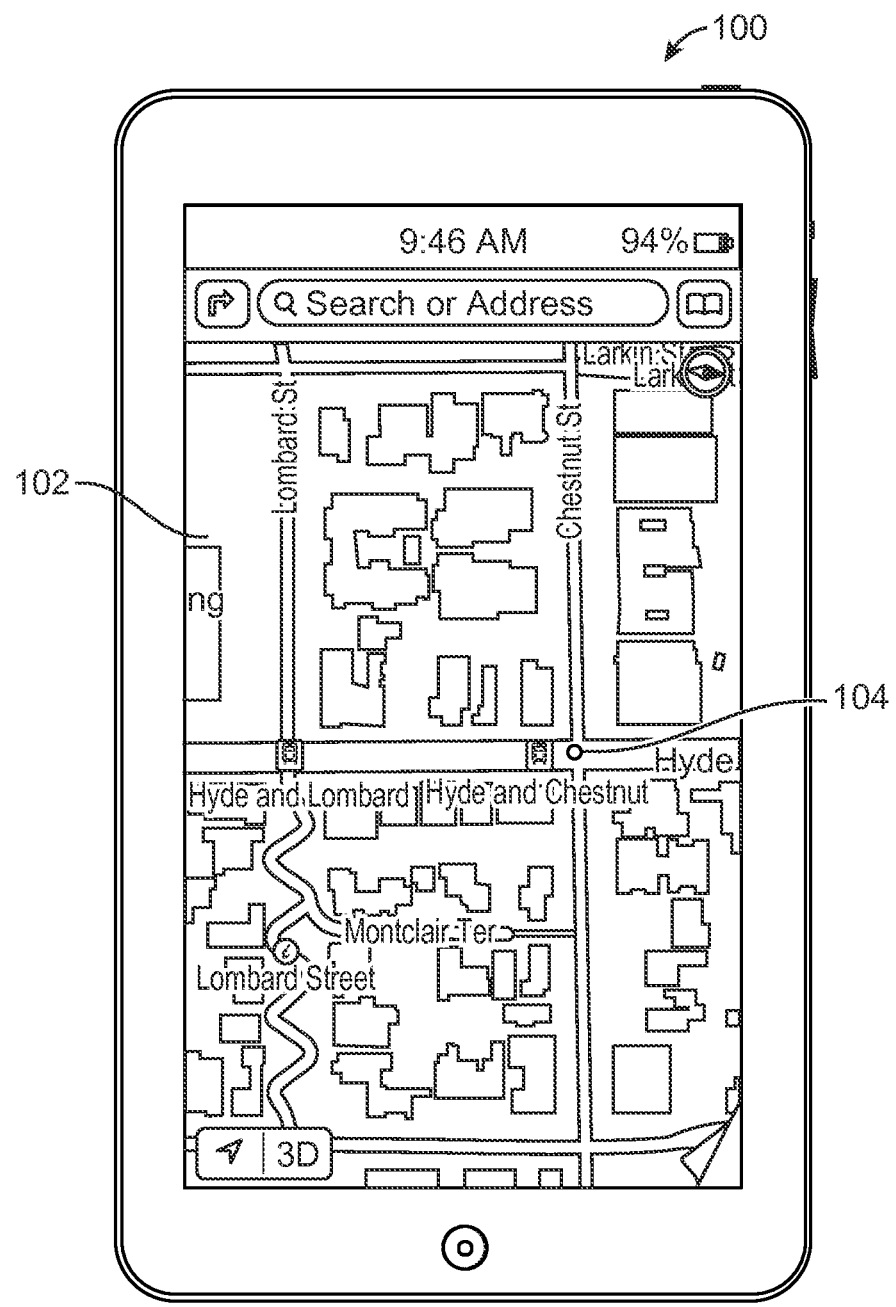
FIGS. 1-13 depict examples of techniques for performing context-sensitive actions in response to received touch input according to some embodiments of the invention.

In the following description, for the purposes of explanation, specific details are set forth in order to provide a thorough understanding of embodiments of the invention. However, it will be apparent that various embodiments may be practiced without these specific details.

Certain embodiments of the invention are directed to an electronic device performing context-sensitive actions in response to received touch input.

For instance, certain embodiments are described that provide for an electronic device performing different actions in response to receiving the same touch input in different contexts. An electronic device can display a user interface of an application (e.g., a map application), and can receive touch input in a region of the user interface. In some embodiments, the touch input can include a gesture such as a drag, swipe, pinch, flick, single-tap, double-tap, rotation, multi-touch gesture, and the like. The touch input can also include a combination of gestures, one or more gestures in combination with other touch input, etc. Upon receipt of the touch input, the electronic device can determine a context. In some embodiments, the context can relate to a mode of the application. For instance, the application can be a map application that displays a representation of map data (e.g., graphical map tiles), and that includes both a standard map mode and a navigation mode. In the case of a such a map application, the determined context can relate to whether the map application is currently in the standard map mode or the navigation mode.

If the electronic device determines that the touch input is received in a first context (e.g., that the map application is in the standard map mode), the electronic device may perform a first action. For instance, if the received touch input corresponds to a drag gesture, the first action may involve the device causing the displayed representation of the map data to "shift" in the direction of and in accordance with the length of the drag gesture (e.g., a linear translation of graphical map tiles). If, however, the electronic device determines that the touch input is received in a second context (e.g., that the map application is in the navigation mode), the electronic device may perform a second action different than the first action. For instance, in response to receiving the drag gesture when in the navigation mode of the map application, the electronic device can cause the displayed representation of the map data to "pan" in accordance with the length and direction of the received drag gesture. Such a panning may involve a rotation of the displayed graphical map tiles that simulates a user "looking" left or right in a virtual sense from the current location of the user as displayed in the user interface of the map application.

Certain embodiments are further described that provide for an electronic device requiring different touch input in different contexts to perform the same action. The electronic device can display a user interface of an application (e.g., a message application), and can receive touch input in a region of the displayed user interface. In some embodiments, the received touch input can correspond to one or more gestures (e.g., a swipe, pinch, flick, etc.). The touch input can also include a combination of gestures, one or more gestures in combination with other touch input, etc. Upon receipt of the touch input, the electronic device can determine a context.

The context may then be used by the electronic device to determine the touch input needed to perform a particular action. Accordingly, different actions may be context-dependent.

For instance, in some embodiments, the context can relate to whether the device is currently in motion or stationary as indicated by sensor data received by an integrated accelerometer, location determination circuitry, and the like. For instance, in the case of a message application, the particular action may be a message deletion. When the device is stationary, a user can provide touch input such as a "short" swipe gesture to perform a message deletion. However to prevent inadvertent message deletions while the user is walking, jogging, bicycling, driving, etc. (i.e. when the device is in motion), a "long" swipe may be needed to delete the message. In this manner, depending on the context (e.g., whether the device is stationary or detected to be in motion), different touch inputs (e.g., a "short" swipe when the device is stationary and a "long" swipe when the device is in motion) are used to perform the same action (e.g., deletion of a message).

In certain other embodiments, the touch input received by the electronic device can be a sequence of gestures. For instance, the application can be a lock application that prompts the user to enter a passcode (e.g., a sequence of single-taps corresponding to a selection of letters, numbers, symbols, etc.) to unlock the device. To make unlocking the electronic device more convenient when the user is walking, jogging, bicycling, driving, etc. (e.g., generally, when the device is detected to be in motion), only a portion of the entire passcode (e.g., a subset of the single-tap selections) that would be required when the device is stationary may be sufficient to unlock the device. Thus, if the electronic device determines that it is stationary, and that the received sequence of gestures corresponds to the entire passcode, the device may perform an unlock function that provides a user access to the functionalities of the device. If, however, the electronic device determines that it is in motion, and that the sequence of gestures corresponds to a selection of a particular subset of the passcode characters, the electronic device can still perform the unlock function despite the fact that the entire passcode has not been entered. This is another example where depending upon the context (e.g., whether the device is stationary or detected to be in motion), different touch input (e.g., entry of the full passcode when the device is stationary and entry of a passcode subset when the device is detected to be in motion) are used to perform the same action (e.g., unlocking the device).

In various embodiments, "context" as used herein can refer to any suitable contextual information such as application mode, representation of data displayed in a user interface (e.g., landscape vs. portrait orientation), motion of an electronic device, time of day, location, and the like.

FIGS. 1-13 depict examples of techniques for performing context-sensitive actions in response to received touch input according to some embodiments. The examples depicted in FIGS. 1-13 are not intended to be limiting.

In FIGS. 1-13, an electronic device 100 is shown displaying user interfaces corresponding to various applications being executed by an electronic device 100. In the examples shown in FIGS. 1-13, electronic device 100 is depicted as an iPhone® provided by Apple Inc. of Cupertino, Calif. In various embodiments, electronic device 100 can be any other suitable computing device including portable and non-portable devices. Exemplary embodiments of such computing devices include the iPad® and iPod Touch® devices provided by Apple Inc. of Cupertino, Calif., laptop computers, other mobile devices, desktop computers, kiosks, and the like.

In FIGS. 1-6, electronic device 100 is shown displaying user interface 102 corresponding to a map application being executed by electronic device 100. This, however, is not intended to be limiting. Context-dependent actions described in the present disclosure may be performed by any suitable application configured to perform actions in response to touch input received from a user.

FIGS. 1-6 depict examples of electronic device 100 performing different actions in response to receiving the same touch input in different contexts. In FIG. 1, a user interface 102 of a map application is displayed by electronic device 100. In some embodiments, the map application can include different modes. For instance, the map application may provide a standard map mode in which map data (e.g., graphical map tiles) is displayed to a user of electronic device 100 and a navigation mode in which routing information along the map is displayed to the user with associated functionalities such as turn-by-turn direction information.

As depicted in FIG. 1, when the map application is in the standard map mode, user interface 102 can display a two-dimensional representation of map data corresponding to a map. The two-dimensional representation is not intended to be limiting. In some other embodiments, a three-dimensional representation of the map data may be displayed in the standard map mode. The map data represented in user interface 102 can be stored in a memory of electronic device 100, in an external database, and/or the like.

As further depicted in FIG. 1, user interface 102 may display an identifier 104 that is indicative of the current location of electronic device 100. In various embodiments, the current location of electronic device 100 can be determined in a number of different ways. For instance, electronic device 100 can utilize a global positioning system (GPS) receiver to receive and process GPS data. In some embodiments, electronic device 100 can determine its current location using cellular tower triangulation and/or signal strength data, wireless access point data, an Internet Protocol (IP) address, and the like.

In some embodiments, the representation of the map data displayed by electronic device 100 can be rendered from the perspective of a virtual camera, where the position and orientation of the virtual camera determine the displayed representation. The position and orientation of the virtual camera can each be changed in response to touch input received from a user of electronic device 100, which in turn changes the displayed representation of the map data. In response to touch input (e.g., one or more gestures), operations can be performed by electronic device 100 to reposition the virtual camera (i.e. change the position and/or orientation), and the representation of the map data re-rendered based on the changed parameters. For instance, the displayed representation can be "shifted" by moving (e.g., translating) the virtual camera along a line parallel to a ground plane of the map data representation, allowing different areas to be viewed. In some embodiments, the map data representation can be zoomed by translating the virtual camera along its optical axis closer to or farther from the ground plane (or by changing a focal length or magnification factor associated with the virtual camera without moving it), thus allowing the area in view to be enlarged or reduced. In some embodiments, the representation of the map data can be rotated by changing the orientation of the virtual camera's optical axis and/or "up" vector. In some embodiments, the representation can be titled by repositioning the virtual camera to change a "tilt" angle between the optical axis and the ground plane of the map. In this manner, the displayed representation of the map data can be manipulated by the user of electronic device 100 using different touch inputs.

Figure 2:
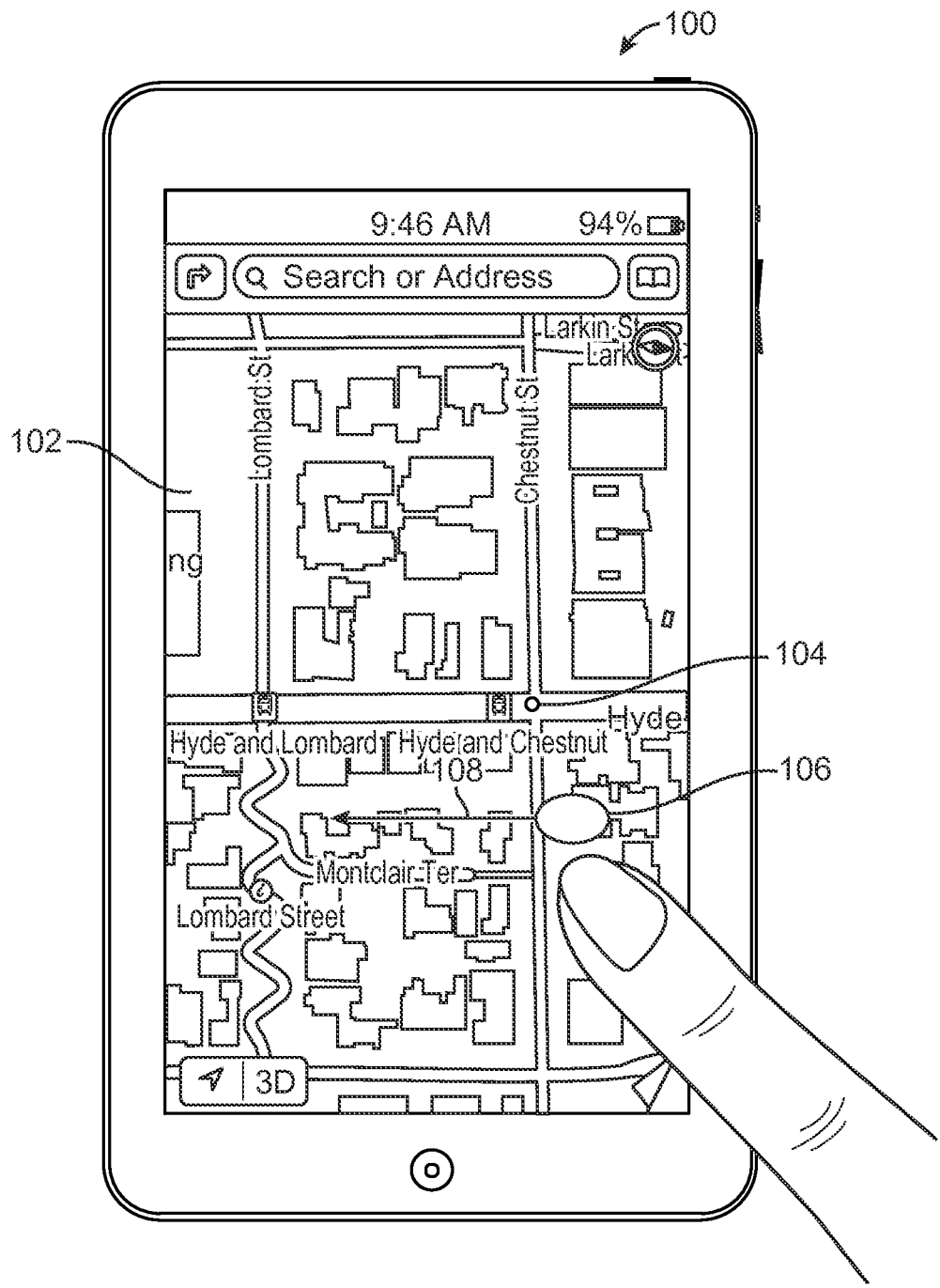

While the map application is in the standard map mode, the user may desire to shift the visible portion of the map data representation displayed in user interface 102 by electronic device 100. As depicted in FIG. 2, to cause the displayed representation of the map data to shift, a user can place a contact (e.g., a finger) on a region 106 of a touchscreen displaying user interface 102, and can move the contact in some direction (left in the embodiment depicted in FIG. 2 as indicated by arrow 108), while maintaining contact with the touchscreen. This movement is often referred to as a "drag" gesture.

Figure 3:
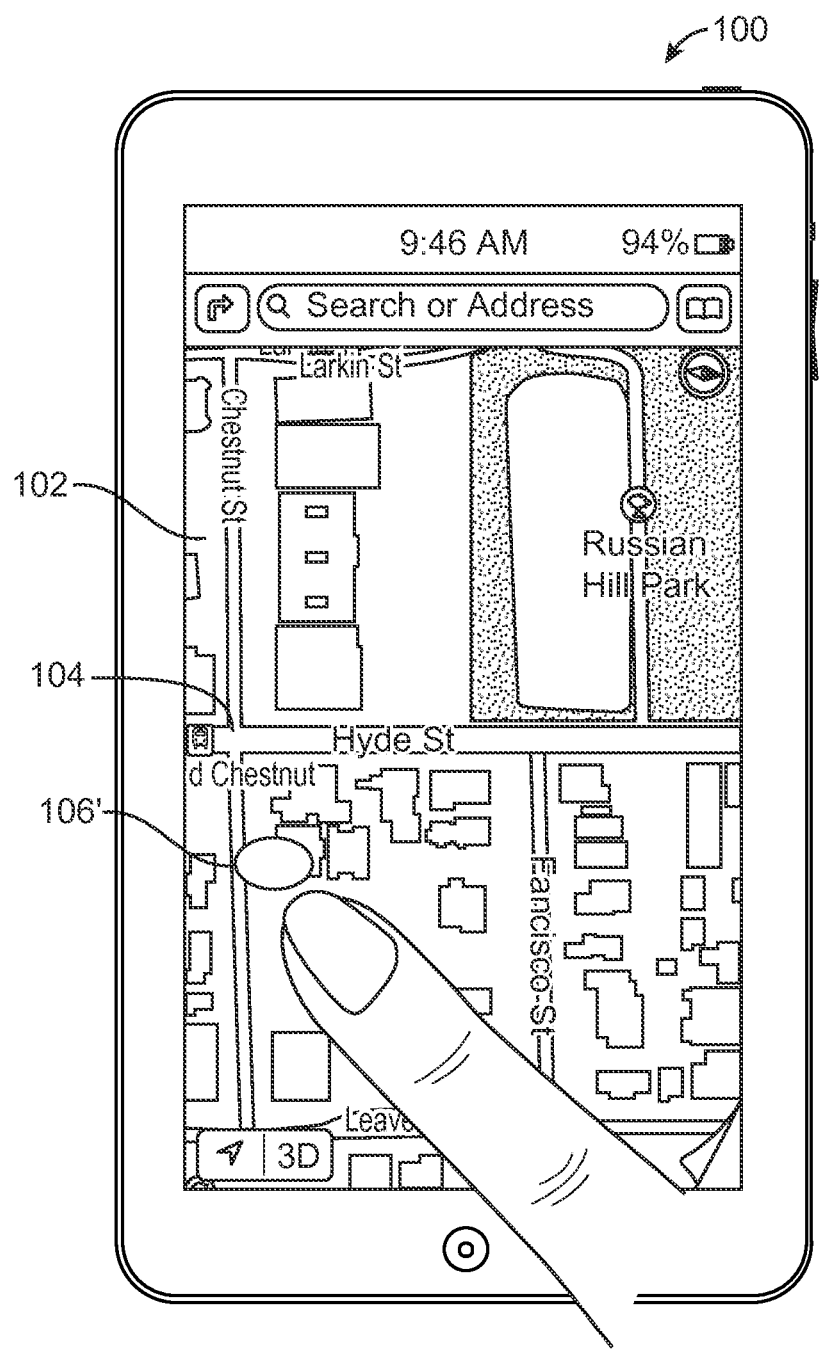

As depicted in FIG. 3, in response to the received touch input, electronic device 100 can shift the representation of the map data in the indicated direction. In the embodiment depicted in FIG. 3, the user has dragged the contact from region 106 to a region 106'. In some embodiments, the displayed representation of the map data can be shifted in accordance with the length of the drag gesture (i.e. the distance between region 106 and region 106'). Thus, as further depicted in FIG. 3, the location of the map data representation displayed beneath region 106 can be the same (or approximately the same) location displayed beneath region 106' upon completion of the drag gesture.

Figure 5:
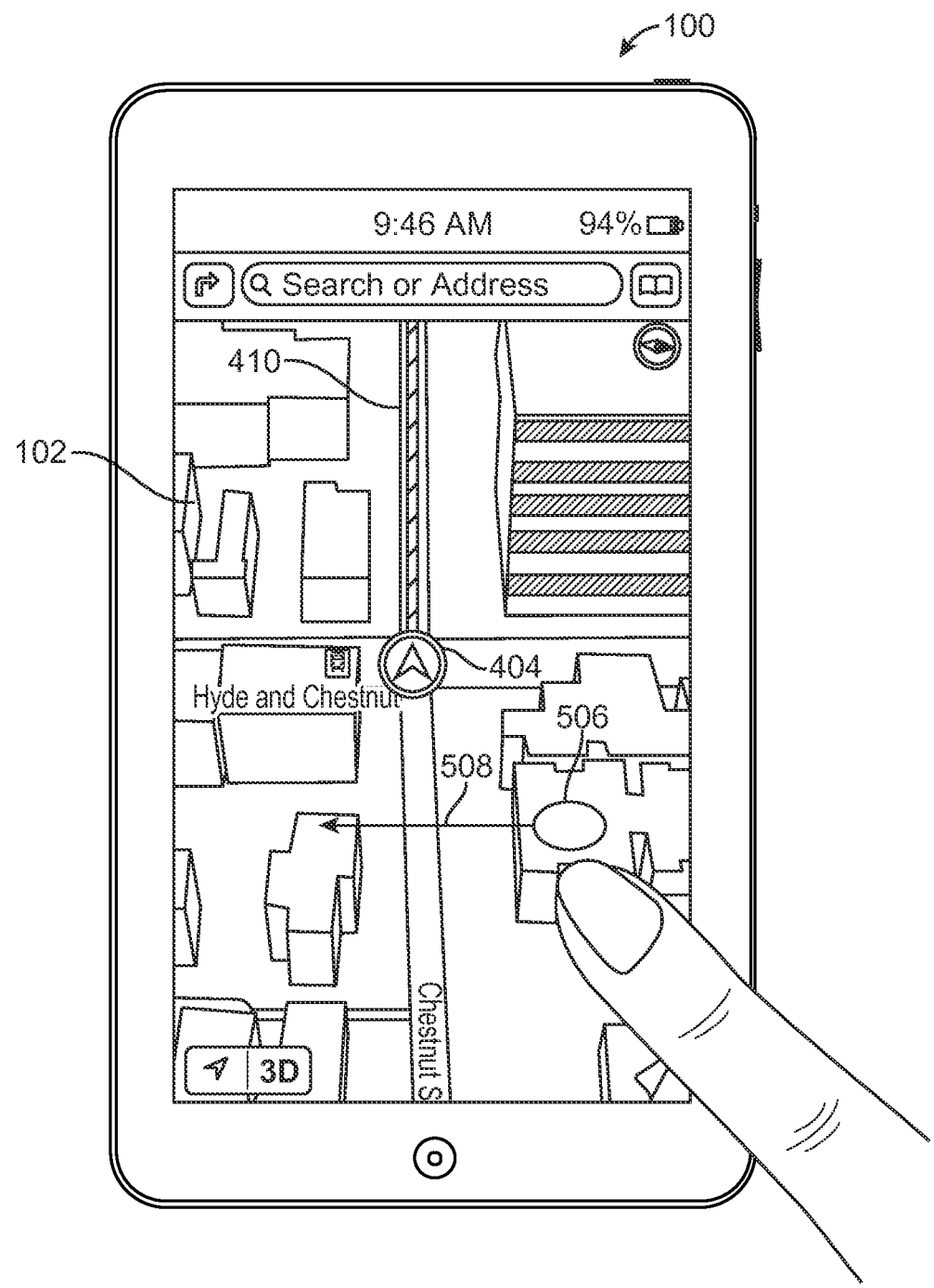
Figure 6:
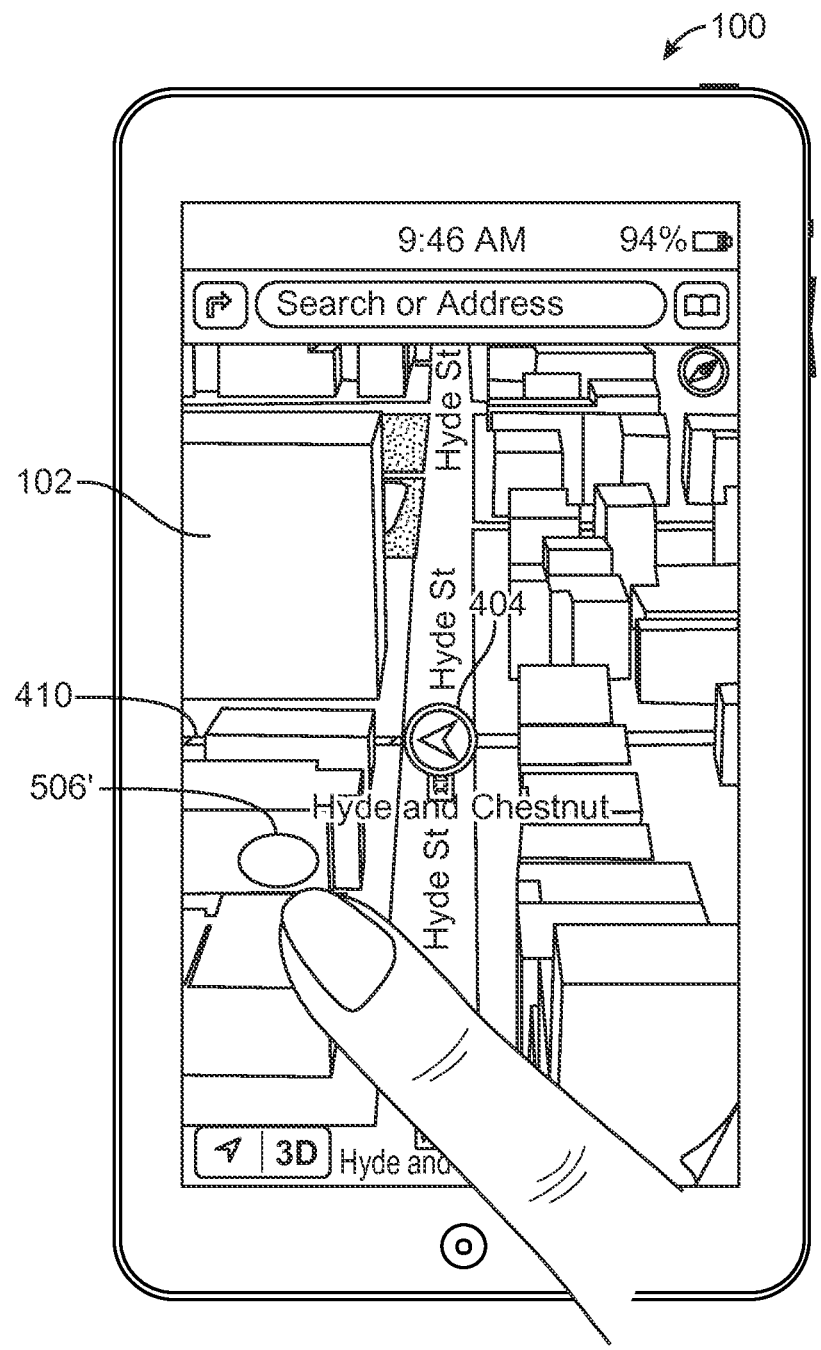

When a gesture is received in a given context, electronic device 100 can in response perform a particular action. Accordingly, in the embodiment described above, a drag gesture received when the map application is operating in the standard map mode causes the map application to linearly shift the displayed representation of the map data in the direction of the drag gesture. However, as described below, in certain embodiments, the same drag gesture received in a different context (as depicted in FIGS. 4-6) may cause electronic device 100 to perform an action that is different than the shift operation.

As previously described, in addition to the standard map mode, the map application executed by electronic device 100 may also provide a navigation mode. This mode is depicted in FIG. 4. In some embodiments, in the navigation mode, the map application may output routing information with respect to the displayed representation of the map data, including but not limited to turn-by-turn directions from a beginning location (which may be the current location) to a destination location. In some embodiments, information identifying the beginning and/or destination locations may be input by the user of electronic device 100, for instance, using touch input (e.g., via a software keyboard), voice input (e.g., using voice recognition circuitry), and the like.

Figure 4:
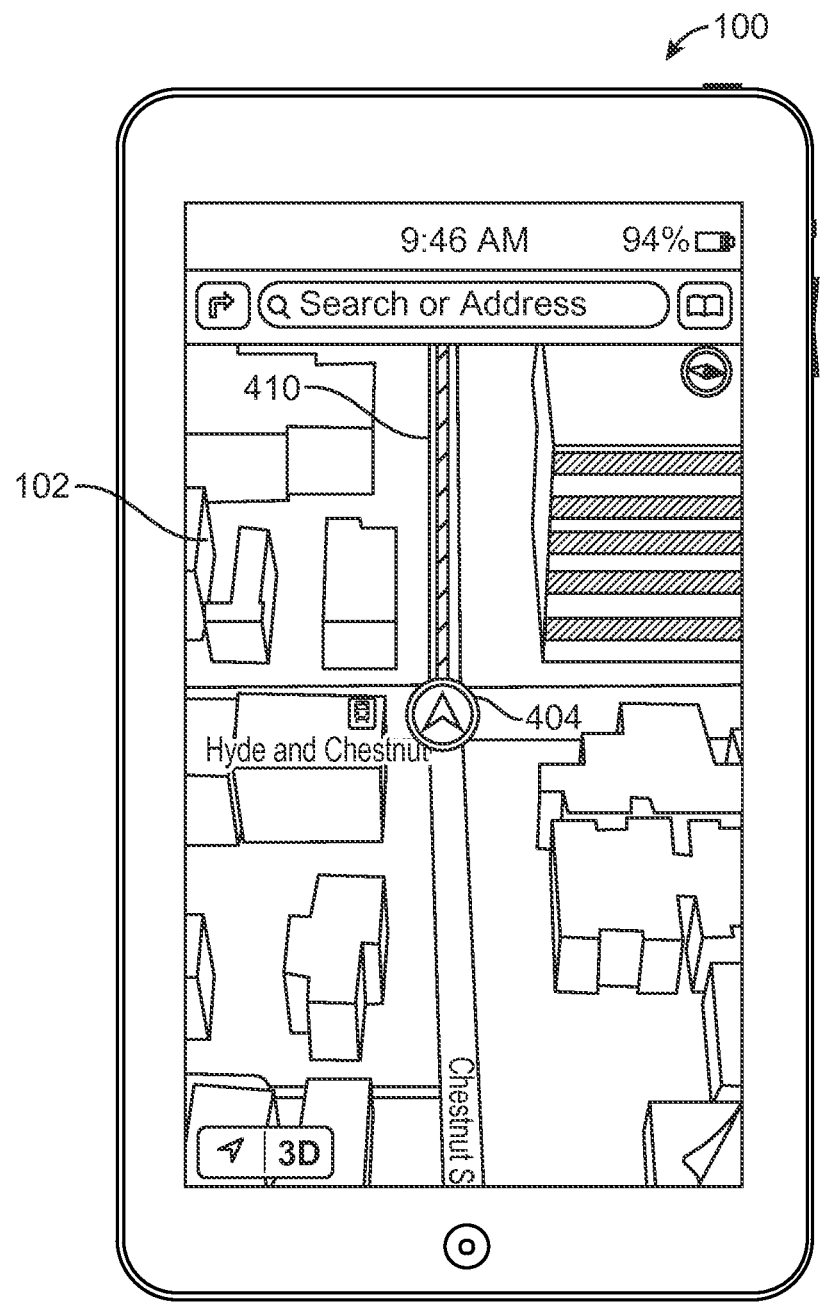

As depicted in FIG. 4, when in the navigation mode, user interface 102 may display a three-dimensional representation of the map data depicted in FIGS. 1-3 and can additionally display an identifier 404 that is indicative of the current location of electronic device 100 and a route 410 from the current location to a destination location (in FIG. 4, the destination location is outside the displayed graphical map tiles). Various different techniques may be used to determine route 410. In some embodiments, electronic device 100 may determine route 410 using information store by electronic device 100 and/or using information from external databases storing geographic coordinates, street addresses, neighborhoods, places of interest, terrain (e.g., street, grass, water, etc.), and the like. The data used to determine route 410 may also be based on third-party provided map data, developer-generated map data, and/or user-generated map data. Route 410 can be of various types including but not limited to a street route (e.g., comprising one or more of highways, freeways, city streets, roads, etc.), a bicycle route, a public-transportation route, a walking route (e.g., a sidewalk-based route), or any other suitable route from one location to another.

In certain embodiments, identifier 404 displayed by the map application can include a directional identifier indicating a relative orientation of the electronic device 100, as depicted in FIG. 4. For instance, electronic device 100 can include a compass sensor that utilizes magnetic fields to determine the orientation of electronic device 100.

As depicted in FIG. 5, the user can provide the same drag gesture described above (i.e. in the context of the standard map mode) when the map application is in the navigation mode. For instance, the user can place a contact (e.g., a finger) on a region 506 of a touchscreen displaying user interface 102, and can move the contact in direction indicated by arrow 508 while maintaining contact with the touchscreen.

As described above, if the drag gesture is received when the map application is operating in the standard map mode, electronic device 100 can linearly shift the displayed representation of the map data in the direction of the drag gesture. However, receiving the same drag gesture in the context of the navigation mode can cause electronic device 100 to perform an action that is different than the shift operation. For instance, as depicted in FIG. 6, in response to the drag gesture (i.e. moving the contact from region 506 to region 506'), the map application can cause the displayed representation of the map data in user interface 102 to be "panned" (instead of shifted as shown in FIG. 3). In certain embodiments, the pan can include a rotation of displayed graphical map tiles that simulates the user "looking" left or right in a virtual sense while maintaining the display of the current location (as indicated by identifier 404) and route 410 on user interface 102.

In certain embodiments, as depicted in FIGS. 5-6, the pan can cause the displayed representation of the map data to rotate about identifier 404. As described above, a rotation can involve changing the orientation of the virtual camera's optical axis and/or "up" vector. It should be noted, however, that in a three-dimensional representation, a rotation purely about the optical axis may not produce the desired panning effect, particularly if the optical axis is not oriented normal to the ground plane of the displayed representation of the map data. Instead, it may be desirable to produce a rotation that presents a view of the same area from a different direction (e.g., looking east versus north). Thus, in some embodiments, the rotation operation associated with a pan can be defined as moving the virtual camera in a circle parallel to the ground plane of the displayed representation of the map data. The center of the circle can be a "target point" where the optical axis of the virtual camera intersects the ground plane, and the radius of the circle may be determined from the current orientation (e.g., tilt angle) and position of the virtual camera. With motion about the circle, the virtual camera can be reoriented to keep the optical axis aimed at the target point (e.g., identifier 404 as shown in FIGS. 4-6). In the special case where the optical axis is normal to the ground plane (i.e. looking straight down), the circular motion of the virtual camera can become a rotation about the optical axis.

As depicted in FIG. 6, the representation of the map data displayed in user interface 102 has been panned approximately 90° in response to the right-to-left drag gesture provide by the user as depicted in FIG. 5. For instance, Hyde Street, which was displayed horizontally in FIGS. 4-5, is now displayed vertically in FIG. 6. Additionally, route 410, which was displayed vertically in FIGS. 4-5, is now displayed horizontally in FIG. 6 In some embodiments, the pan may be clockwise in response to a right-to-left drag gesture, counter-clockwise in response to a left-to-right drag gesture, or clockwise in response to a left-to-right drag gesture. Further, in some embodiments, the pan may be more or less than 90°. For instance, the distance between region 506 at the beginning of the drag gesture (shown in FIG. 5) and identifier 404 of the current location can affect the degree of rotation associated with the pan. For instance, the degree of rotation may increase with the distance between region 506 and identifier 404 at the beginning of the drag gesture, or alternatively may decrease as the distance between region 506 and identifier 404 is increased.

In some embodiments, when the contact is removed (i.e. when the user removes their finger from region 506' of touchscreen), electronic device 100 can revert back to the representation of the map data depicted in FIGS. 4-5, with identifier 404 of the current location displayed at or near the center of user interface 102 and route 410 pointing "up." In other embodiments, electronic device 100 can revert back to the representation depicted in FIGS. 4-5 in response to some additional user input (e.g., one or more gestures, button input, voice input, etc.), or in response to the expiration of a predetermined period of time (e.g., a "time-out" function) measured from the beginning of the panning, the removal of the user's finger, or any other suitable reference point.

As described above, an application executed by electronic device 100 can perform different actions in response to receiving the same touch input in different contexts. For instance, as described above, a map application can linearly shift a displayed representation of map data in response to receiving a drag gesture in the context of a standard map mode, and can pan a representation of the map data in response to receiving the drag gesture in the context of a navigation mode. In various embodiments, any other suitable application can perform different actions in response to receiving the same touch input in different contexts. The touch input can include any suitable touch input according to various embodiments. For instance, as described above, the touch input can include one or more gestures such as a drag, swipe, pinch, flick, single-tap, double-tap, rotation, multi-touch gesture, and/or the like.

In various embodiments, any suitable context may be used by electronic device 100 to determine which action to perform in response to a particular touch input. In some embodiments, a first context can relate to a first representation of data displayed in the user interface, and a second context can relate to a second representation of the data. For instance, electronic device 100 may perform different actions in response to the same touch input based on the orientation of the touchscreen (e.g., landscape, portrait, etc.). In the map application example, when user interface 102 is displayed in a landscape orientation (e.g., a first representation of data), electronic device 100 may be able to display additional map data to the left or right of identifier 404 using a shift instead of a pan due to the added lateral distance provided by the landscape orientation. However, when in the portrait orientation (e.g. the second representation of data), the lateral distance provided may be insufficient to display the additional map data while maintaining the display of identifier 404. Thus, in some embodiments, electronic device 100 can linearly shift the representation of map data in response to a gesture (e.g., a drag gesture) provided in the landscape orientation, but may instead perform a pan if the same gesture is provided in a portrait orientation (as depicted in FIGS. 1-6).

FIGS. 7-13 depict examples of electronic device 100 requiring different touch input in different contexts to perform the same action. More particularly, in FIGS. 7-10, electronic device 100 is shown displaying user interface 702 corresponding to a message application, and more particularly an email message application. This, however, is not intended to be limiting. As described above, context-sensitive actions described in the present disclosure may be performed by any suitable application capable of responding to different touch input received in different contexts.

Figure 7:
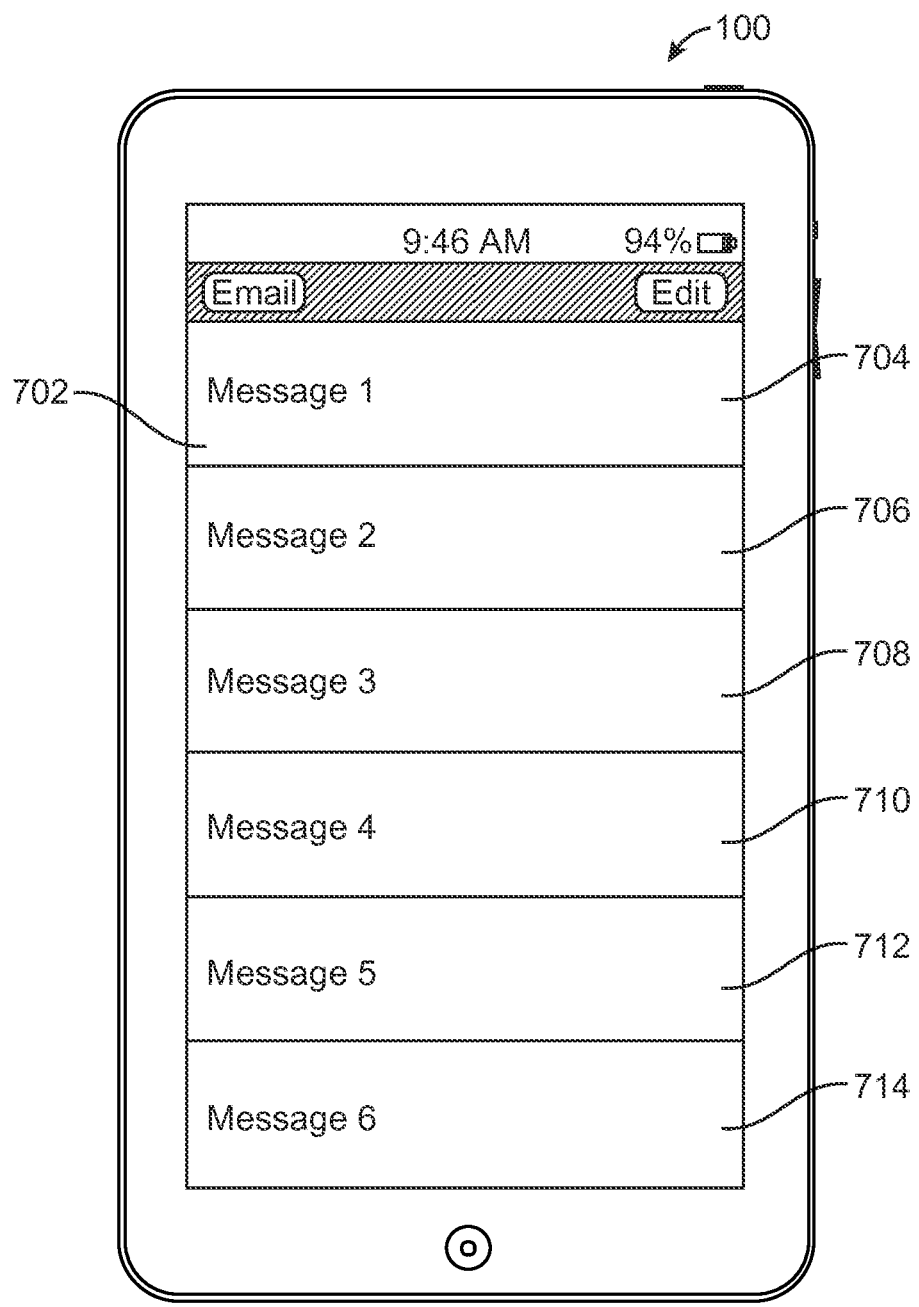

As depicted in FIG. 7, user interface 702 of the message application is displayed by electronic device 100, and includes a list of email messages 704-714 that may be stored in a memory of electronic device 100, on a remote server, and/or the like. In some embodiments, the message application may enable a user of electronic device 100 to delete a message by providing a particular touch input to electronic device 100. For instance, in one embodiment, the message application may perform a message deletion in response to a swipe gesture provided by the user on a touchscreen of electronic device 100.

Figure 8:
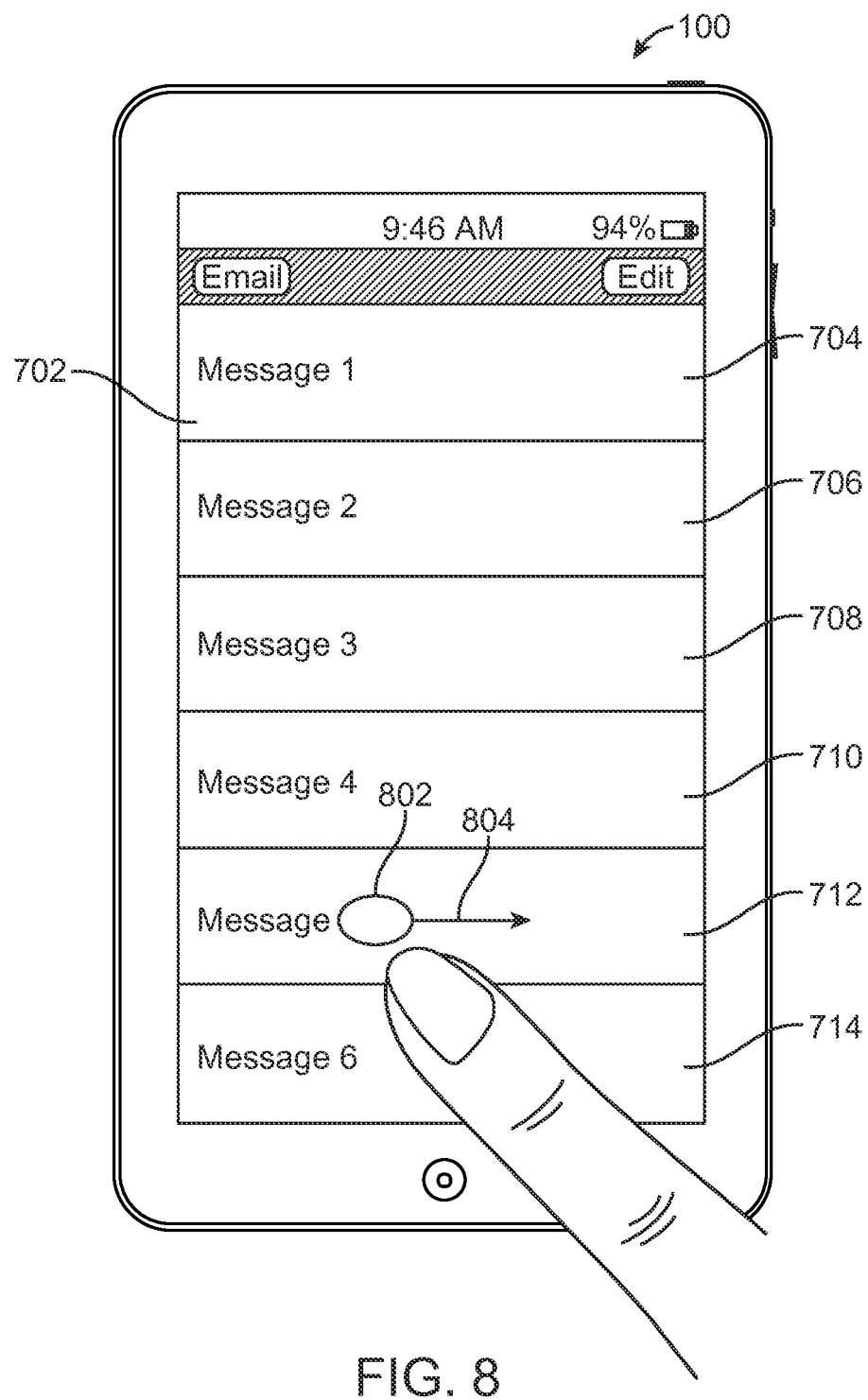

FIG. 8 depicts an example of a message deletion using a swipe gesture. As depicted in FIG. 8, the user can perform the swipe gesture over a particular message 712 to delete the message. The swipe gesture may be performed by placing a contact (e.g., a finger) on a region 802 of the touchscreen in the vicinity of message 712 and moving the contact some distance (left-to-right in the embodiment depicted in FIG. 8 as indicated by arrow 804), while maintaining contact with the touchscreen. In some embodiments, the swipe gesture can be a drag gesture (e.g., as described above with respect to FIGS. 1-6) but provided by the user with a higher speed or velocity. For instance, electronic device 100 can analyze the movement of the user's finger to determine whether to interpret the gesture as a drag or swipe. In such embodiments, if the gesture is provided with a velocity that meets or exceeds some threshold value, electronic device can interpret the gesture as a swipe instead of a drag. In other embodiments, a swipe gesture and a drag gesture can be interpreted as the same touch input. Thus, the swipe gesture described with respect to FIGS. 8-10 can also be the drag gesture described with respect to FIGS. 1-7 in some embodiments.

Figure 9:
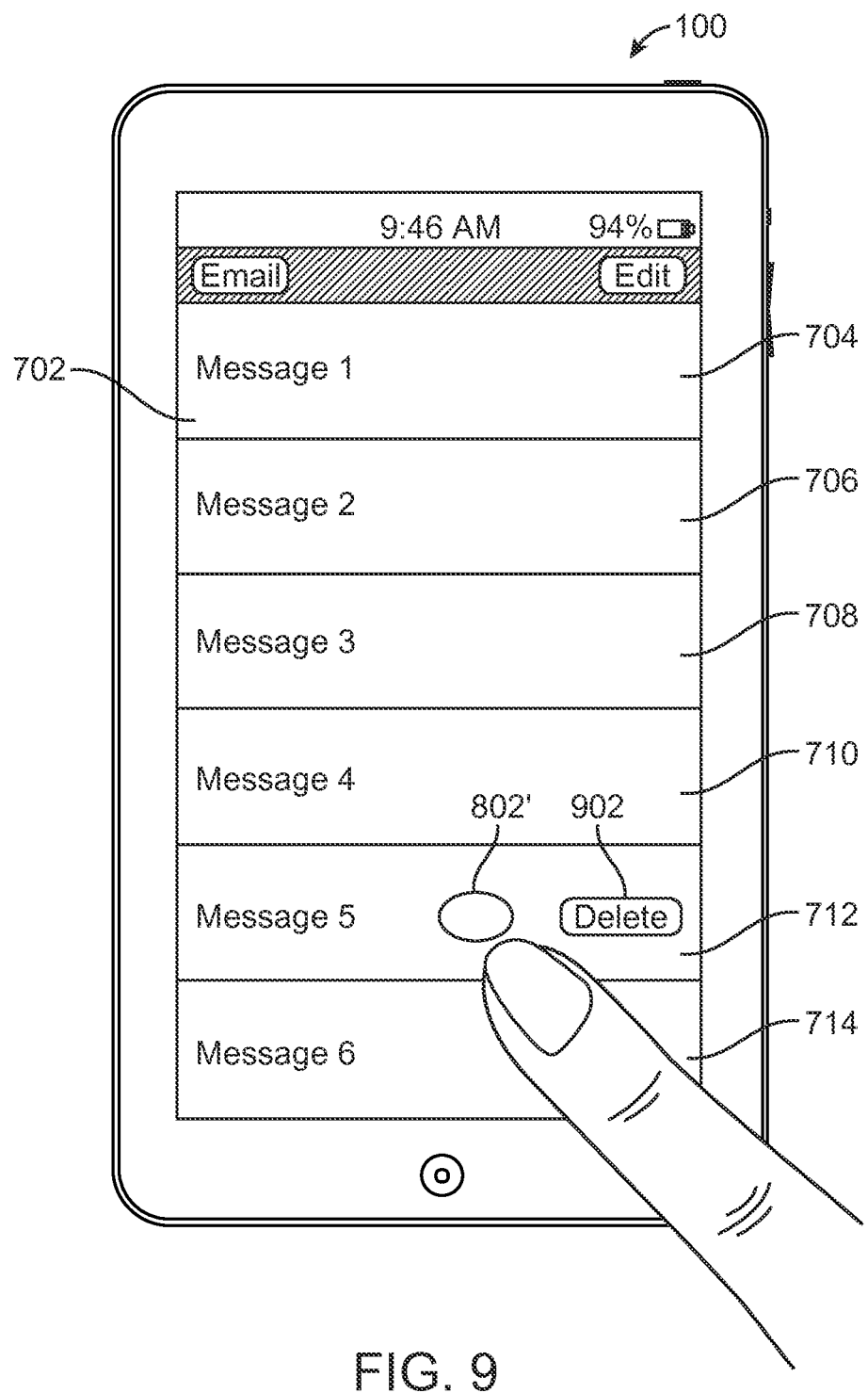

As depicted in FIG. 9, the user has moved (i.e. swiped) the contact from region 802 to region 802'. In response to receiving the swipe gesture, electronic device 100 may consider contextual information to determine whether to perform the message deletion. In some embodiments, the context can relate to whether the device is currently in motion or stationary. For instance, to prevent errant message deletions caused by inadvertent gestures provided while the user is walking, jogging, bicycling, driving, etc., electronic device 100 may determine whether it is in motion or stationary. Such a determination can be made by electronic device 100 using any suitable sensor device such as an accelerometer, location determination circuitry, and/or the like.

Referring back to FIG. 9, upon receiving the swipe gesture, electronic device 100 can determine whether it is in motion or stationary. If electronic device 100 determines that it is stationary, message 712 can be deleted in response to the received gesture. If, however, electronic device 100 determines that it is in motion, electronic device 100 may instead require additional touch input in order to delete message 712. For instance, as depicted in FIG. 9, if electronic device 100 receives the swipe gesture while it is in motion, a confirmation element 902 may additionally be displayed on or near message 712 in user interface 702. Upon user selection of confirmation element 902, electronic device 100 may then delete message 712. Such a confirmation element may not be displayed when the swipe gesture is received while electronic device 100 is stationary. The requirement of the additional user selection of confirmation element 902 when electronic device 100 is in motion is intended to reduce the occurrence of inadvertent message deletions due to unintended swipes that may occur as a result of the user interacting with electronic device 100 while the user is and electronic device 100 are in motion.

In some embodiments, user selection of confirmation element 902 may be required to delete a message whether electronic device 100 is in motion or stationary. In such embodiments, in response to receiving the swipe gesture when electronic device 100 is stationary, confirmation element 902 can be displayed in user interface 702. As described above, in response to user selection of confirmation element 902, message 712 may be deleted. If, however, the swipe gesture is received when electronic device 100 is in motion, confirmation element 902 may not be displayed. By not displaying confirmation element 902 in response to a swipe gesture received when electronic device 100 is in motion, in such embodiments, the occurrence of inadvertent message deletions due can be further reduced.

Figure 10:
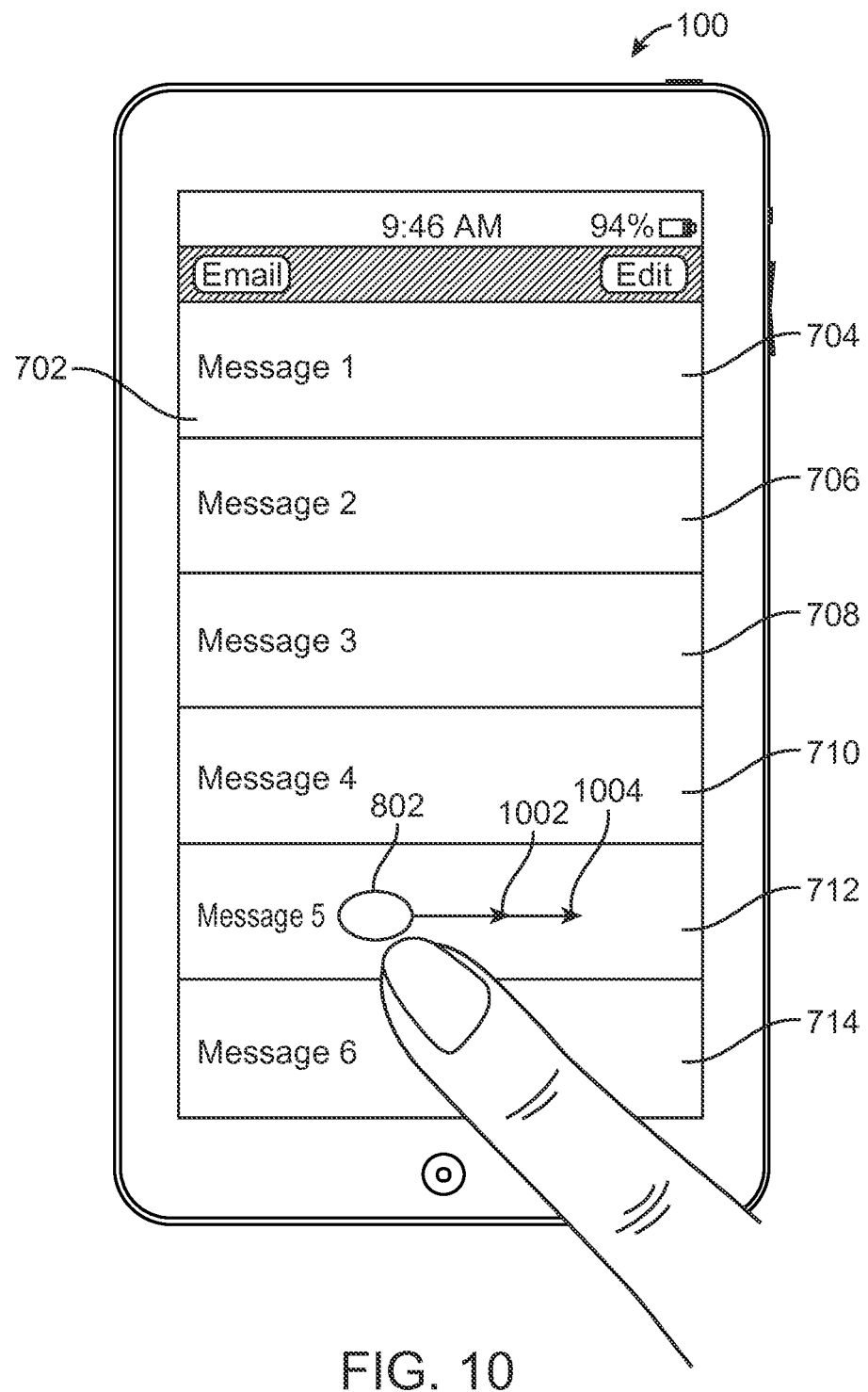

In some embodiments, the touch input required to delete a message in different contexts may include different forms of the same gesture. For instance, as depicted in FIG. 10, electronic device 100 may recognize swipe gestures of different lengths 1002, 1004, and the start and end points of a recognized swipe may depend on whether electronic device 100 is stationary or in motion. In some embodiments, if electronic device 100 determines that it is stationary, a "short" swipe gesture may be sufficient to delete a message (e.g., message 712). In such embodiments, the user can generate a "short" swipe gesture by placing the contact (e.g., the finger) on region 802 of the touchscreen in the vicinity of message 712 and moving the contact in the direction of arrow 1002 in a swiping motion that starts at region 802 and ends at the head of arrow 1002.

To prevent inadvertent message deletions when the user is walking, jogging, bicycling, driving, etc., electronic device 100 may require a "long" swipe to delete a message when electronic device 100 is in motion. Such a "long" swipe may involve the user placing the contact (e.g., the finger) on region 802 and moving the contact in the direction of arrow 1004 in a swiping motion that starts at region 802 and ends at the head of arrow 1004. Thus, if electronic device 100 determines that it is in motion (e.g., via accelerometer data, location determination circuitry data, etc.), a "short" swipe may not be recognized by electronic device 100 as sufficient to delete message 712. Instead, electronic device 100 may perform the message deletion only if the received touch input corresponds to the "long" swipe. Thus, the touch input required to delete a message in different contexts (e.g., electronic device 100 being in motion or stationary) can include different forms of the same gesture (e.g., a "long" swipe or a "short" swipe). Since a longer swipe may involve more effort by the user, the incidence of errant message deletions can be reduced in some embodiments.

Arrows 1002, 1004 depicted in FIG. 10 represent the path of exemplary swipe gestures of different length and are provided as mere examples. In various embodiments, the position, length, and/or direction of the touch input used to perform a message deletion may vary, and any other suitable touch input may be utilized, including gestures such as a pinch, flick, single-tap, double-tap, rotation, multi-touch gesture, and the like. Further, any other suitable action may be performed in response to receiving different touch inputs in different contexts according to various embodiments.

Figure 11:
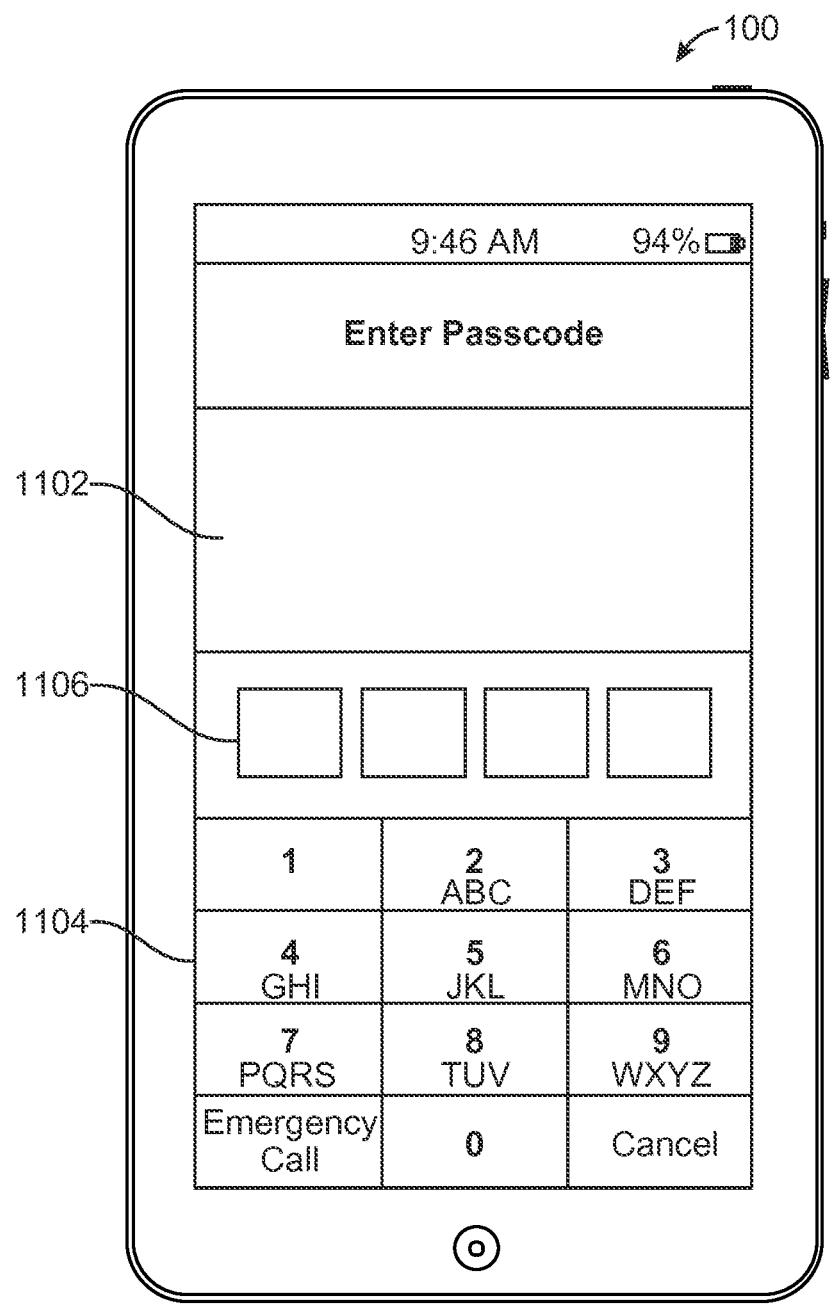
Figure 12:
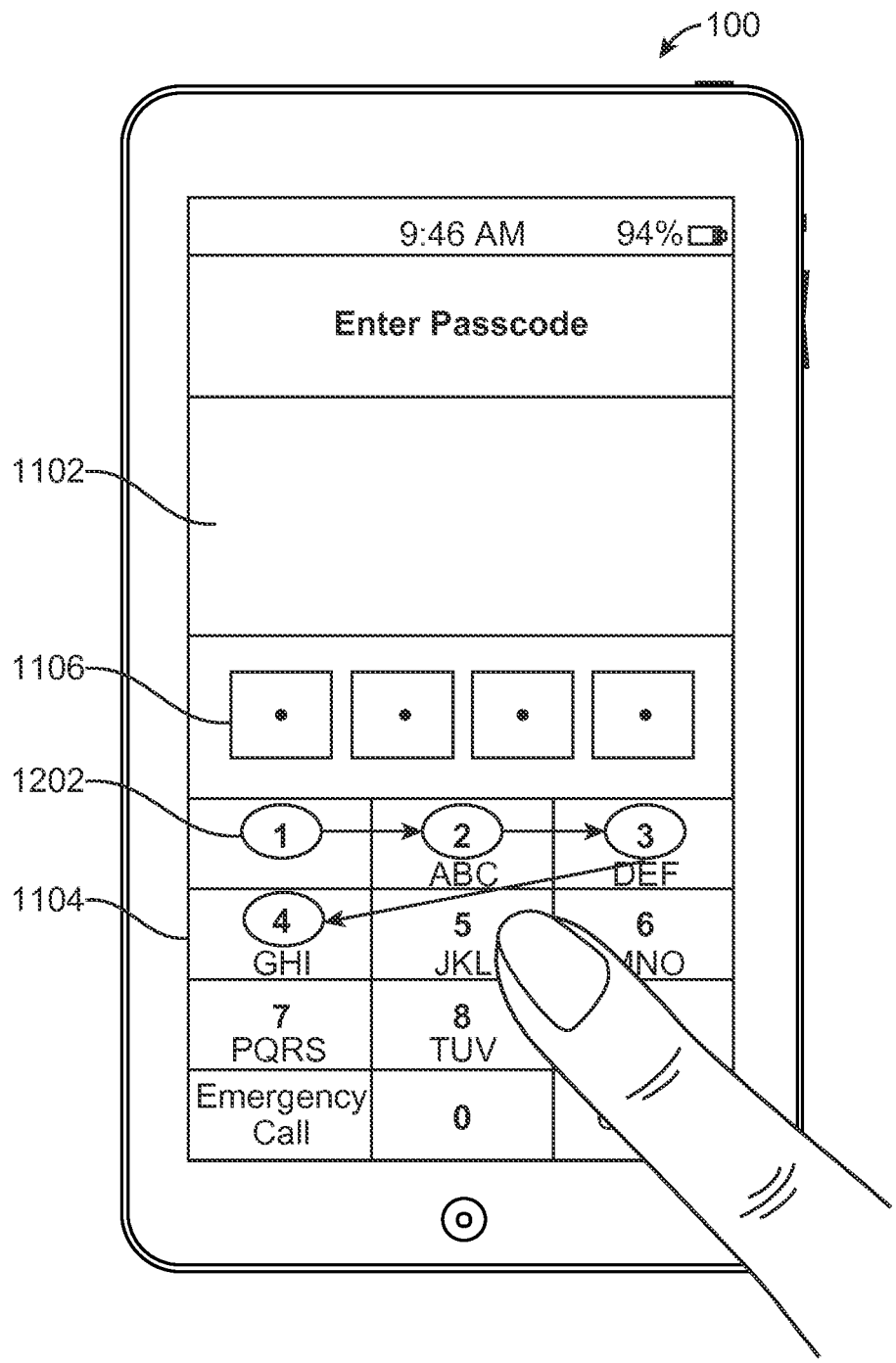
Figure 13:
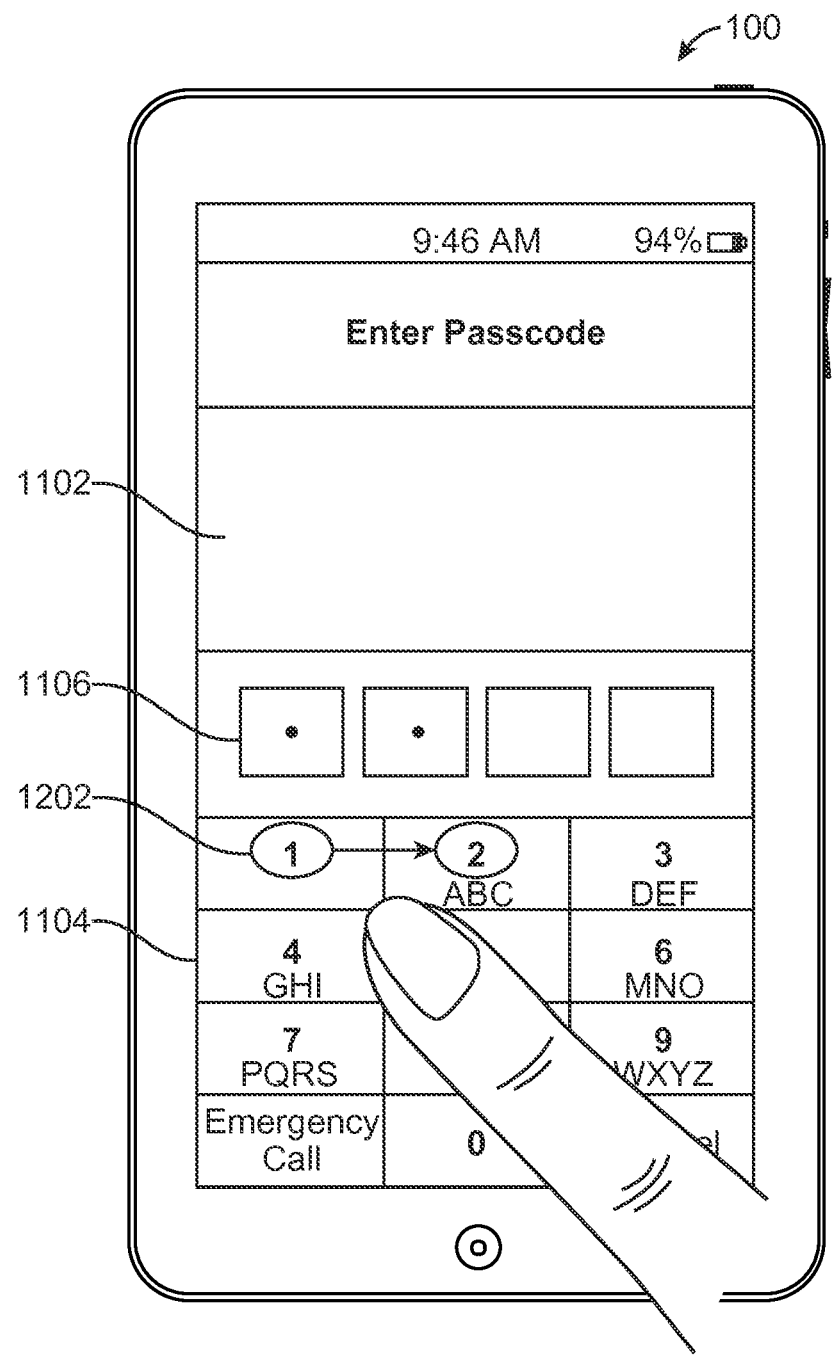

In some embodiments, the different touch inputs required by electronic device 100 to perform the same action in different contexts can include different sequences of the same gesture. For instance, as depicted in FIGS. 11-13, electronic device 100 can display a user interface 1102 corresponding to a lock application. This, however, is not intended to be limiting. Context-sensitive actions described in the present disclosure may be performed using any suitable application capable of performing an action in response to different sequences of gestures in received different contexts.

As depicted in FIG. 11, user interface 1102 of the lock application can be displayed by electronic device 100, and can include a plurality of user selectable passcode elements 1104. In some embodiments, as further depicted in FIG. 11, user interface 1102 can also include one or more selection acknowledgement elements 1106 that can provide a user with a graphical acknowledgement when one or more of the passcode elements 1104 have been selected.

In some embodiments, the lock application can prompt the user to enter a predetermined passcode to allow access to the various functionalities of electronic device 100 (i.e. to "unlock" electronic device 100). For instance, to unlock electronic device 100, a particular sequence of gestures such as single-taps corresponding to the selection of characters (e.g., letters, numbers, and/or symbols) can be required to "unlock" electronic device 100. As depicted in FIG. 12, the user can enter a passcode 1, 2, 3, 4 (as a non-limiting example) by placing a contact (e.g., a finger) on a region 1202 of the touchscreen in the vicinity of the passcode element corresponding to the number "1," and then providing single-tap gestures by placing the contact in the vicinity of the passcode elements corresponding to the numbers "2," "3," and "4," sequentially.

To allow the user to more easily unlock electronic device 100 when the user is walking, jogging, bicycling, driving, etc., in some embodiments, only a portion of the entire passcode (e.g., a subset of the single-tap passcode character selections) may be required. Thus, as the passcode characters are being selected (or prior to the first selection), electronic device 100 may determine contextual information such as whether electronic device 100 is in motion or stationary. As described above, such a determination can be made by electronic device 100 using any suitable sensor device such as an accelerometer, location determination circuitry, and/or the like. If electronic device 100 determines that it is stationary, single-tap gestures corresponding to a sequential selection of the entire passcode (e.g., 1, 2, 3, 4) may be required to unlock the electronic device 100. If, however, electronic device 100 determines that it is in motion, a particular subset of the single-tap selections may be sufficient to unlock the device. For instance, as depicted in FIG. 13, if electronic device 100 receives the first two characters of the passcode (e.g., 1, 2) while it is in motion, electronic device 100 may perform the unlock function despite the fact that the remaining two characters of the passcode (e.g., 3, 4) have not yet been selected. Since touch input can be more difficult to provide while the user is in motion, the unlocking of electronic device 100 upon receipt of only a portion of the entire passcode may provide ease of use and convenience to users in various embodiments of the invention.

Figure 14:
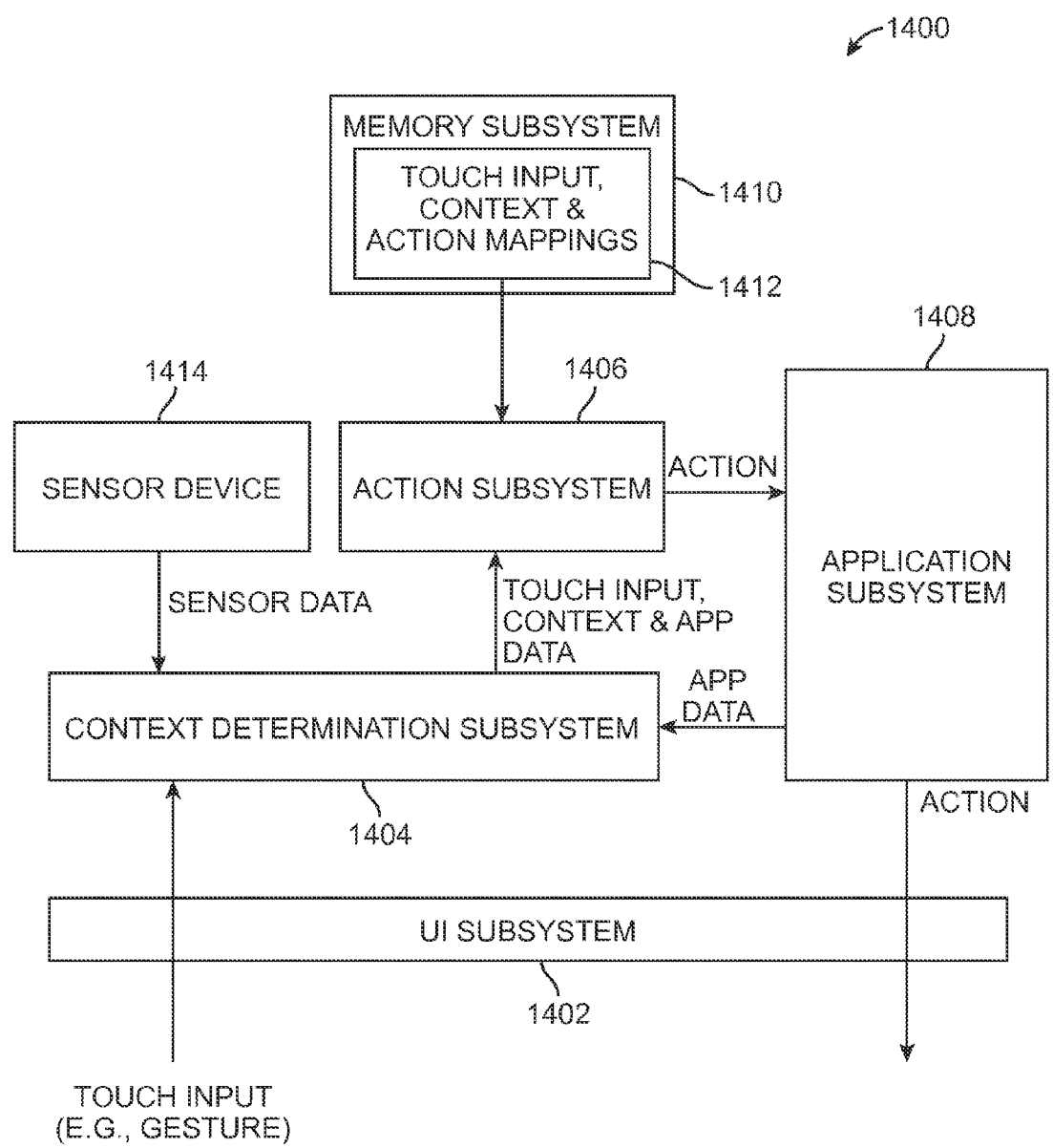
FIG. 14 depicts a simplified diagram of a system that may incorporate an embodiment of the invention.

FIG. 14 depicts a simplified diagram of a system 1400 that may incorporate an embodiment of the invention. In the embodiments depicted in FIG. 14, system 1400 includes multiple subsystems including a user interaction (UI) subsystem 1402, a context determination subsystem 1404, an action subsystem 1406, an application subsystem 1408, and a memory subsystem 1410 storing touch input, context, and action mappings 1412. As depicted in FIG. 14, system 1400 may further include a sensor device 1414. One or more communication paths may be provided enabling one or more of the subsystems to communicate with and exchange data with one another. One or more of the subsystems depicted in FIG. 14 may be implemented in software, in hardware, or combinations thereof. In some embodiments, the software may be stored on a transitory or non-transitory medium (e.g., stored in memory) and executed by one or more processors of system 1400.

It should be appreciated that system 1400 depicted in FIG. 14 may have other components than those depicted in FIG. 14. Further, the embodiment shown in FIG. 14 is only one example of a system that may incorporate an embodiment of the invention. In some other embodiments, system 1400 may have more or fewer components than shown in FIG. 14, may combine two or more components, or may have a different configuration or arrangement of components. In some embodiments, system 1400 may be part of an electronic device. For instance, system 1400 may be part of a portable communications device, such as a mobile telephone, a smart phone, or a multifunction device. Exemplary embodiments of electronic devices include, without limitation, the iPhone®, iPod Touch®, and iPad® devices from Apple Inc. of Cupertino, Calif. In some other embodiments, system 1400 may also be incorporated in other electronic devices such as desktop computers, kiosks, and the like.

UI subsystem 1402 may provide an interface that allows a user to interact with system 1400. UI subsystem 1402 may output information to the user. For instance, UI subsystem 1402 may include a display device such as a monitor or a screen. UI subsystem 1402 may also enable the user to provide inputs to system 1400. In some embodiments, UI subsystem 1402 may include a touch-sensitive interface (also sometimes referred to as a touchscreen) that can both display information to a user and also receive inputs from the user. For instance, in some embodiments, UI subsystem 1402 can receive touch input from a user. Such touch input may correspond to one or more gestures, such as a swipe, drag, pinch, flick, single-tap, double-tap, rotation, multi-touch gesture, and/or the like. In some other embodiments, UI subsystem 1402 may include one or more input devices that allow a user to provide inputs to system 1400 such as, without limitation, a mouse, a pointer, a keyboard, or other input device. In certain embodiments, UI subsystem 1402 may further include a microphone (e.g., an integrated microphone or an external microphone communicatively coupled to system 1400) and voice recognition circuitry configured to facilitate audio-to-text translation.

Memory subsystem 1410 may be configured to store data and instructions used by some embodiments of the invention. In some embodiments, memory subsystem 1410 may include volatile memory such as random access memory or RAM (sometimes referred to as system memory). Instructions or code or programs that are executed by one or more processors of system 1400 may be stored in the RAM. Memory subsystem 1410 may also include non-volatile memory such as one or more storage disks or devices, flash memory, or other non-volatile memory devices. In some embodiments, memory subsystem 1410 can store touch input, context, and action mappings 1412. In some embodiments, mappings 1412 can include a lookup table storing the relationship between touch inputs (e.g., gestures), contexts, and corresponding actions for various applications.

As described above, system 1400 may be part of an electronic device. Thus, in some embodiments, memory subsystem 1410 may be part of the electronic device. In some embodiments, however, all or part of memory subsystem 1410 may be part of a remote server computer (e.g., a web-based server accessible via the Internet).

In some embodiments, UI subsystem 1402, context determination subsystem 1404, action subsystem 1406, application subsystem 1408, memory subsystem 1410, and sensor device 1414 working in cooperation, may be responsible for performing processing related to performing context-sensitive actions in response to received touch input from a user. For instance, context determination subsystem 1404 can receive touch input from UI subsystem 1402 as provided by a user. In some embodiments, the touch input can correspond to a gesture, a combination of gestures, one or more gestures in combination with other touch input, etc. Context determination subsystem 1404 can then determine a current context for the touch input. The context determination may be based upon various sources of information. In some embodiments, the context may be determined based at least in part on application ("app") data provided by application subsystem 1408. App data may include data identifying the application being executed when the touch input was received such as a map application, message application, lock application, or any other suitable application. In some embodiments, app data may further include data describing a mode of the application. For instance, in the case of a map application, the mode can be a standard map mode, a navigation mode, etc.

The information used by context determination subsystem 1404 to determine a context may further include sensor data received from sensor device 1414. In some embodiments, sensor device can include an accelerometer, an altimeter, location determination circuitry (e.g., a GPS receiver, wireless or data network receiver, etc.), a barometer, and/or the like. Thus, context determination subsystem 1404 can determine contextual information regarding motion of an electronic device implementing system 1400.

When the context is determined, context determination subsystem 1404 can pass the contextual information, the received touch input, and at least a portion of the app data such as the identity of the application to action subsystem 1406. Upon receipt, action subsystem 1406 can communicate with memory subsystem 1410 to determine whether an action is to be performed, and if so, which action to perform. For instance, action subsystem 1406 can make this determination by accessing a lookup table including touch input, context, and action mappings 1412 for the application being executed when the touch input was received. If an action is to be performed in response to the received touch input and based upon the determined context, action subsystem can transmit a message to application subsystem 1408 with instructions to perform the particular action. Application subsystem 1408 can then perform the action. In some embodiments, application subsystem 1408 can generate a graphical representation of the performed action, and can communicate with UI subsystem 1402 to display the graphical representation to the user on the touchscreen, for instance. In some embodiments, context determination subsystem 1404 and action subsystem 1406 may be part of application subsystem 1408.

Figure 18:
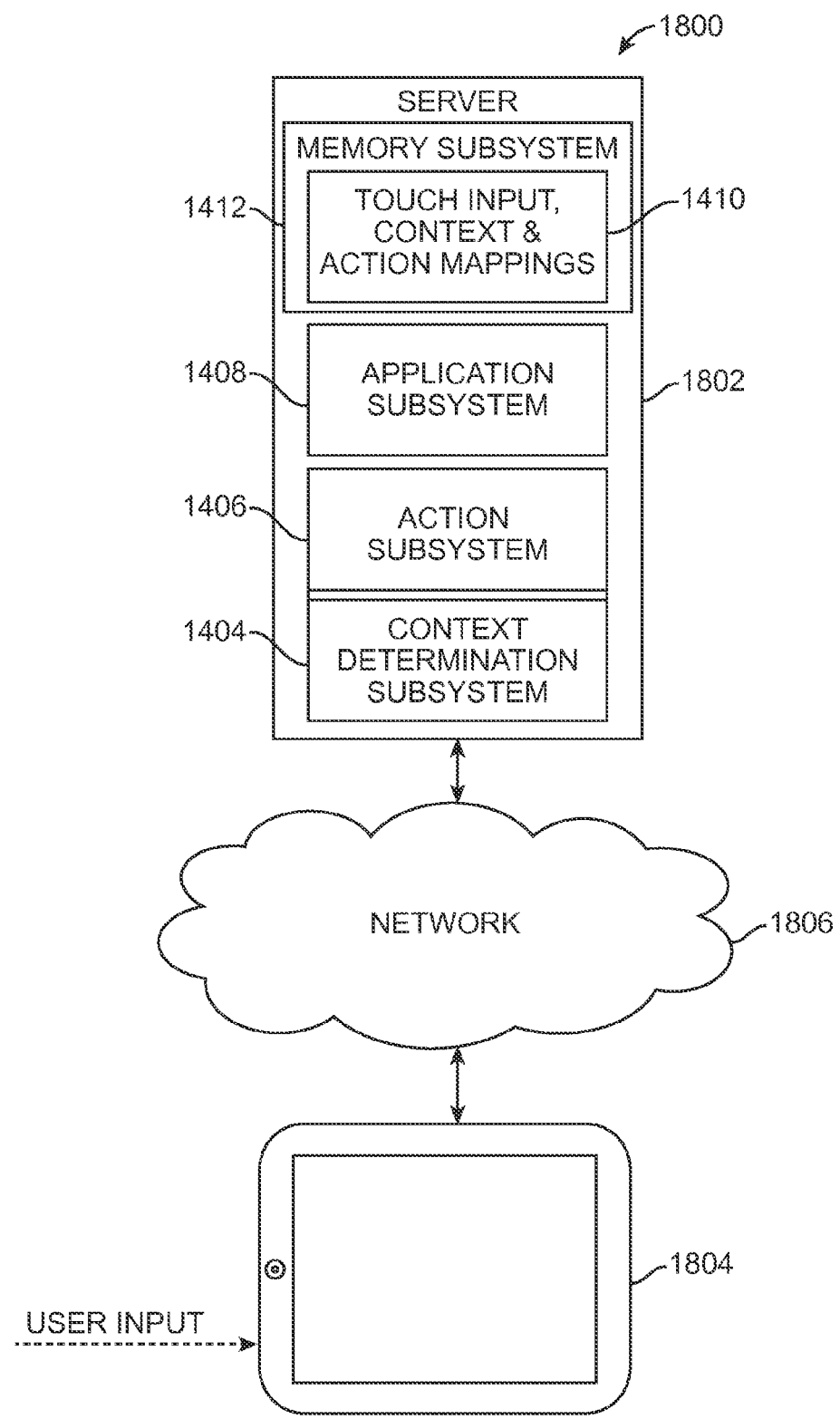
FIG. 18 depicts a simplified diagram of a distributed system for performing context-sensitive actions in response to received touch input according to an embodiments of the invention.

System 1400 depicted in FIG. 14 may be provided in various configurations. In some embodiments, system 1400 may be configured as a distributed system where one or more components of system 1400 are distributed across one or more networks in the cloud. FIG. 18 depicts a simplified diagram of a distributed system 1800 for performing context-sensitive actions in response to received touch input according to an embodiment of the invention. In the embodiments depicted in FIG. 18, context determination subsystem 1404, action subsystem 1406, application subsystem 1408, and memory subsystem 1410 storing touch input, context and action mappings 1412 are provided on a server 1802 that is communicatively coupled with a remote electronic device 1804 via a network 1806.

Network 1806 may include one or more communication networks, which could be the Internet, a local area network (LAN), a wide area network (WAN), a wireless or wired network, an Intranet, a private network, a public network, a switched network, or any other suitable communication network. Network 1806 may include many interconnected systems and communication links including but not restricted to hardwire links, optical links, satellite or other wireless communications links, wave propagation links, or any other ways for communication of information. Various communication protocols may be used to facilitate communication of information via network 1806, including but not restricted to TCP/IP, HTTP protocols, extensible markup language (XML), wireless application protocol (WAP), protocols under development by industry standard organizations, vendor-specific protocols, customized protocols, and others.

In the configuration depicted in FIG. 18, the touch input can be received by electronic device 1804. A user of electronic device 1804 may provide touch input. In some embodiments, the touch input can correspond to a gesture, a combination of gestures, one or more gestures in combination with other touch input, etc. Electronic device 1804 may also include one or more sensor devices such as an accelerometer, locations determination circuitry, and/or the like. In some embodiments, touch input corresponding to one or more gestures may be communicated to server 1802 via network 1806. In some embodiments, sensor data provided by the one or more sensors can also be communicated to server 1802 via network 1806. Context determination subsystem 1404 may then determine a context in cooperation with action subsystem 1406 on server 1802. In some cases, sensor data received from electronic device 1804 may also be used by context determination subsystem 1404 to determine the context. The received touch input, context, and app data can be passed to action subsystem 1406 which can access the touch input, context, and action mappings 1412 in memory subsystem 1410. Upon determining the appropriate action based on the context, touch input, and app data, the action may be performed by application subsystem 1408 and any corresponding graphical data communicated to electronic device 1804 for presentment to the user on a display, for instance. In some embodiments, the action may be communicated by application subsystem 1408 to electronic device 1804. In such embodiments, electronic device 1804 can perform the action and present the corresponding graphical data to the user via the display. In some embodiments, action subsystem 1406 and content determination subsystem 1404 may be part of application subsystem 1408 on server 1802.

In the configuration depicted in FIG. 18, context determination subsystem 1404, action subsystem 1406, application subsystem 1408, and memory subsystem 1410 are remotely located from electronic device 1804. In some embodiments, server 1802 may facilitate the performance of context-dependent actions for multiple electronic devices. The multiple devices may be served concurrently or in some serialized manner. In some embodiments, the services provided by server 1802 may be offered as web-based or cloud services or under a Software as a Service (SaaS) model.

It should be appreciated that various different distributed system configurations are possible, which may be different from distributed system 1800 depicted in FIG. 18. The embodiment shown in FIG. 18 is thus only one example of a distributed system for performing context-dependent actions in response to touch input and is not intended to be limiting.

Figure 15:
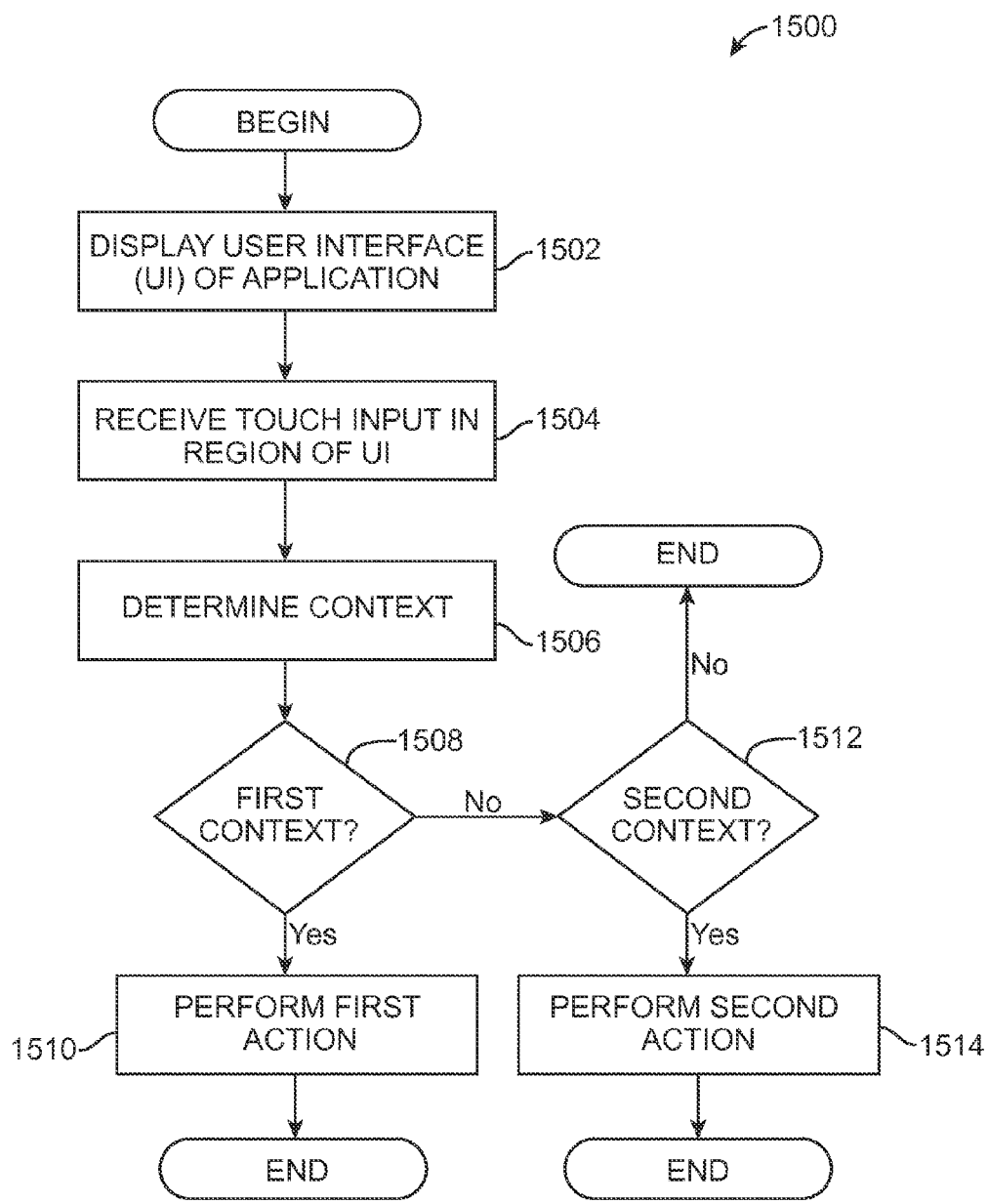
FIG. 15 depicts a simplified flowchart depicting a method of performing different actions in response to receiving the same touch input in different contexts according to an embodiment of the invention.

FIG. 15 depicts a simplified flowchart depicting a method 1500 of performing different actions in response to receiving the same touch input in different contexts according to an embodiment of the invention. The processing depicted in FIG. 15 may be implemented in software (e.g., code, instructions, and/or a program) executed by one or more processors, hardware, or combinations thereof. The software may be stored on a non-transitory computer-readable storage medium. The particular series of processing steps depicted in FIG. 15 is not intended to be limiting.

As depicted in FIG. 15, at step 1502, a user interface of an application can be displayed. In some embodiments, the application can be a map application. However, in various embodiments, the application can be any suitable application configured to perform actions in response to touch input received from a user.

At step 1504, touch input can be received in a region of the displayed user interface. In some embodiments, the touch input can correspond to a gesture, a combination of gestures, one or more gestures in combination with other touch input, etc. In some embodiments, a gesture can be a drag, swipe, pinch, flick, single-tap, double-tap, rotation, multi-touch gesture, and/or the like.

At step 1506, a context can be determined. In some embodiments, the determined context can relate to a mode of the application. For instance, in the case of a map application, the determined context can relate to whether the map application is in a standard map mode or a navigation mode. In some embodiments, the determined context can relate to a representation of data displayed in the user interface. For instance, the determined context can relate to whether the representation of data is associated with a portrait mode or a landscape mode of the user interface.

At decision 1508, it can be determined whether the context is a first context. For instance, the first context can relate to the standard map mode of a map application, the portrait mode of the user interface, or any other suitable context. If the context is determined to be the first context, method 1500 may proceed to step 1510. At step 1510, in response to determining that the context is the first context, a first action can be performed. For instance, in some embodiments, the first action can be a shift, a pan, a scroll, a zoom, and a tilt, and/or the like. If, however, it is determined at decision 1508 that the context is not a first context, method 1500 may proceed to decision 1512.

At decision 1512, it can be determined whether the context is a second context different from the first context. For instance, the second context can relate to the navigation mode of the map application, the landscape mode of the user interface, or any other suitable context different from the first context. If the context is determined to be the second context, method 1500 may proceed to step 1514. At step 1514, a second action different from the first action can be performed. For instance, in some embodiments, if the first action is a shift, a pan, a scroll, a zoom, or a tilt, the second action can be a different one of the shift, the pan, the scroll, the zoom, or the tilt.

If it is determined at decision 1512 that the context is also not the second context, as shown in FIG. 15, method 1500 may end. For instance, the received touch input may not correspond to any action to be performed by the electronic device. Further, in some embodiments, there can be a third context, a fourth context, a fifth context, etc., in addition to a third action, a fourth action, a fifth action, etc. Thus, if the context is determined to not be the second context at decision 1512, method 1500 may involve additional contextual determinations and the performance of further actions.

As a non-limiting example of method 1500, the application can be a map application and, at step 1502, a user interface of the map application can be displayed. Touch input such as a drag gesture can be received in a region of the displayed user interface, at step 1504, and at step 1506, a context can be determined. The context may relate to the mode of the map application at the time the gesture is received. For instance, the context may be a first context relating to a standard map mode of the map application or a second context relating to a navigation mode (e.g., turn-by-turn direction mode) of the map application. If the map application is in the standard map mode, as determined at decision 1508, a first action can be performed at step 1510 in response to the drag gesture. For instance, the first action can be a linear shift of the displayed representation of the map data. As described above, the shift can be in the direction, and in accordance with the length, of the received swipe gesture. If, however, the application is instead in the navigation mode, as determined at decision 1512, a second action can be performed at step 1514. For instance, the second action can be a panning of the representation of the map data displayed in the user interface.

Figure 16:
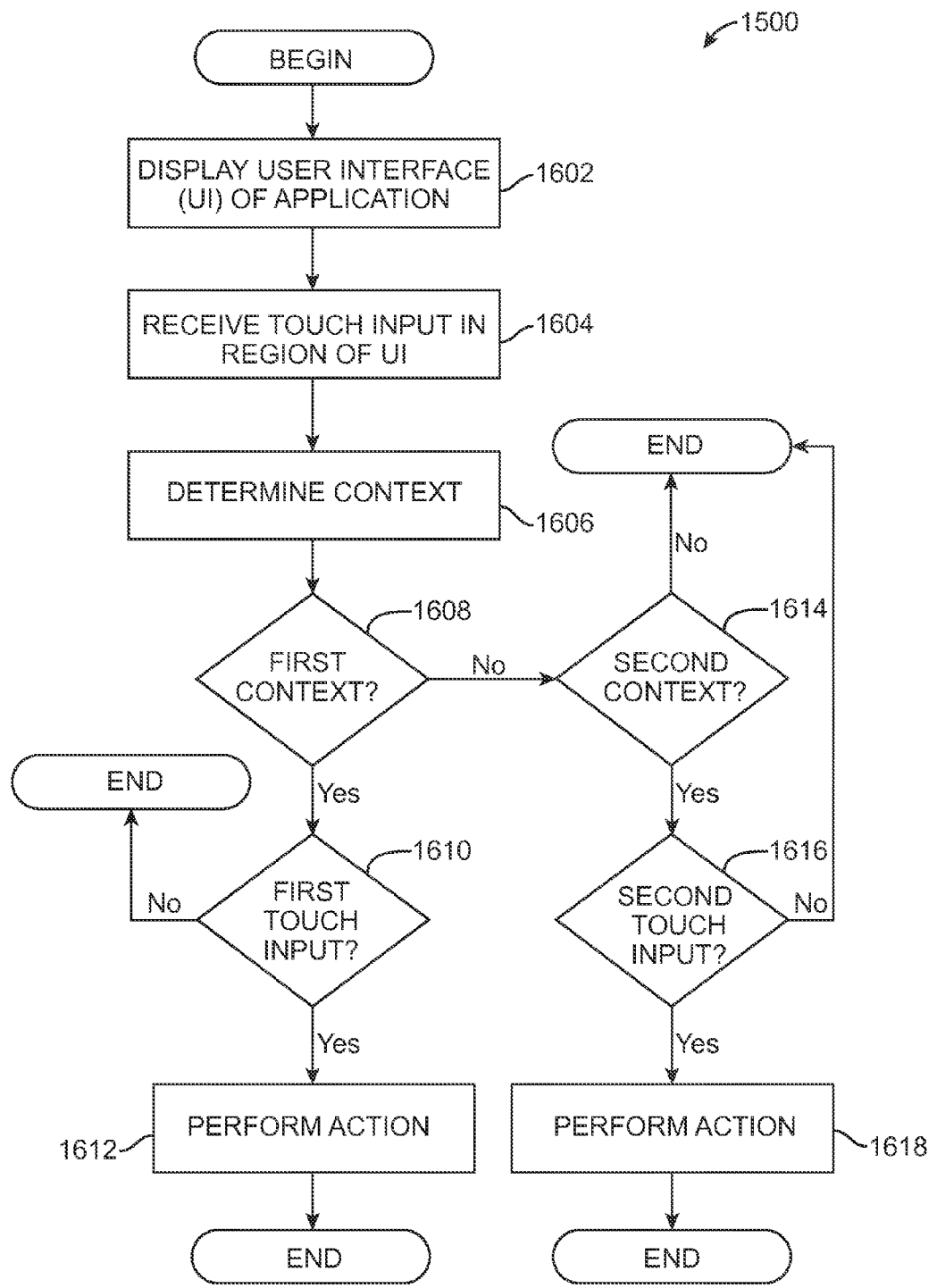
FIG. 16 depicts a simplified flowchart depicting a method of requiring different touch input in different contexts to perform the same action according to an embodiment of the invention.

As described herein, in certain other embodiments, different touch input may be required in different contexts to perform the same action. FIG. 16 depicts a simplified flowchart depicting a method 1600 directed to such a process. The processing depicted in FIG. 16 may be implemented in software (e.g., code, instructions, and/or a program) executed by one or more processors, hardware, or combination thereof. The software may be stored on a non-transitory computer-readable storage medium. The particular series of processing steps depicted in FIG. 16 is not intended to be limiting.

As depicted in FIG. 16, at step 1602, a user interface of an application can be displayed. In some embodiments, the application can be a message application. In other embodiments, the application can be a lock application. However, in various embodiments, the application can be any suitable application capable of performing an action in response to receiving different touch input in different contexts.

At step 1604, touch input can be received in a region of the displayed user interface. In some embodiments, the touch input can correspond to a gesture, a combination of gestures, one or more gestures in combination with other touch input, etc. In some embodiments, a gesture can be a drag, swipe, pinch, flick, single-tap, double-tap, rotation, multi-touch gesture, and/or the like.

At step 1606, a context can be determined. In some embodiments, the context can relate to a motion of the electronic device, such as whether the electronic device performing method 1600 is stationary or in motion. In some embodiments, the motion of the electronic device can be determined based upon sensor data provided by a sensor device such as an accelerometer, location determination circuitry, and/or the like.

At decision 1608, it can be determined whether the context is a first context. For instance, the first context can relate to the electronic device being stationary (i.e. not in motion). If the context is determined to be the first context, method 1600 can proceed to decision 1610. At decision 1610, it can be determined whether the touch input received at step 1604 is a first touch input. For instance, the first touch input can be a swipe gesture corresponding to a first length in the region of the displayed user interface, a first sequence of gestures, or any other suitable touch input. If it is determined at decision 1610 that the touch input received at step 1604 is not the first touch input, as shown in FIG. 16, method 1600 may end. For instance, the received touch input may not correspond to any action to be performed by the electronic device when received in the first context. If, however, it is determined that the touch input is the first touch input, method 1600 can proceed to step 1612.

As described above, if the context is the first context (as determined at decision 1608) and the touch input is the first touch input (as determined at decision 1610), method 1600 can proceed to step 1612 where an action is performed. In various embodiments, the action can include a message deletion, an unlock function, or any other suitable action.

Referring back to decision 1608, if it is determined that the context is not the first context, method 1600 can proceed to decision 1614. At decision 1614, it can be determined whether the context is a second context. For instance, the second context can relate to the electronic device being in motion (e.g., that the user of the device is walking, jogging, bicycling, driving, etc.). If it is determined at decision 1614 that the context is also not the second context, in some embodiments, method 1600 may end. For instance, the received touch input may not correspond to any action to be performed by the electronic device. In some embodiments, however, there can be a third context, a fourth context, a fifth context, etc. Thus, if the context is determined to not be the second context at decision 1614, method 1600 may involve additional contextual determinations. If, however, it is determined at decision 1614 that the context is the second context, the method can proceed to decision 1616.

At decision 1616, it can be determined whether the touch input received at step 1604 is a second touch input. For instance, the second touch input can be a swipe gesture corresponding to a second length in the region of the displayed user interface, the second length being longer than the first length, a second sequence of gestures that includes a subset of the first sequence of gestures, a swipe gesture in combination with a selection of a confirmation element displayed in the user interface, or any other suitable touch input. If it is determined that the touch input is not the second touch input, in embodiments of the invention, method 1600 can end. For instance, the received touch input may not correspond to any action to be performed by the electronic device when received in the second context. If, however, it is determined that the touch input is the second touch input, method 1600 can proceed to step 1618.

As described above, if the context is the second context (as determined at decision 1614) and the touch input is the second touch input (as determined at decision 1616), method 1600 can proceed to step 1618 where the action (i.e. the same action of step 1612) is performed.

As a non-limiting example of method 1600, the application can be a message (e.g., email, SMS, voice message, etc.) application and the action to be performed can be a message deletion. At step 1602, a user interface of the message application can be displayed, and at step 1604, touch input can be received in a region of the displayed user interface. For instance, the touch input can be a first touch input including a swipe gesture of a first length or a second touch input including a swipe gesture of a second length that is longer than the first length. At step 1606, a context can be determined. The context may relate to whether an electronic device performing method 1600 is stationary or in motion as indicated by sensor data provided by a sensor device such as an accelerometer, location determination circuitry, etc. For instance, the context may be a first context relating to the electronic device being stationary or a second context relating the electronic device being in motion. If the electronic device is stationary, as determined at decision 1608, and if the touch input is the first touch input (i.e. the "short" swipe), as determined at decision 1610, the message deletion can be performed at step 1612. If the device is in motion, however, the second touch input (i.e. the "long" swipe) may be required to perform the message deletion. As described above, the requirement of a "long" swipe may reduce the occurrence of inadvertent message deletions while the user is walking, jogging, bicycling, driving, etc. Thus, if the device is in motion, as determined at decision 1614, and if the touch input is the "long" swipe, as determined at decision 1616, the message deletion can be performed at step 1618.

It should be noted that in above example, the "long" swipe may include the "short swipe" since the difference between the touch inputs can be just the length of the swipe according to some embodiments. Thus, referring back to decision 1610, if it is determined that the touch input is the "long" swipe in the context of the device being stationary, method 1600 may still perform the message deletion of step 1612 since the "long" swipe may be recognized by the device as including the "short" swipe according to some embodiments.

As another non-limiting example of method 1600, the application can be a lock application (e.g., prompting the user for a passcode) and the action can be an unlock function that "unlocks" an electronic device performing method 1600 thus providing the user access to the functionalities of the device. At step 1602, a user interface of the lock application can be displayed, and at step 1604, touch input can be received in a region of the displayed user interface. For instance, the touch input can be a first touch input including a first sequence of single-tap gestures corresponding selection of the passcode or a second touch input including a second sequence of single-tap gestures corresponding to selection of a portion or subset of the passcode characters. At step 1606, a context can be determined. The context may relate to whether the device is stationary or in motion as indicated by sensor data provided by a sensor device such as an accelerometer, location determination circuitry, etc. For instance, the context may be a first context relating to the electronic device being stationary or a second context relating the electronic device being in motion. If the electronic device is stationary, as determined at decision 1608, and if the touch input is the first touch input (i.e. the first sequence of single-tap gestures corresponding to selection of the entire passcode), as determined at decision 1610, the unlock function can be performed at step 1612. If the device is in motion, however, the second touch input (i.e. the second sequence of single-tap gestures corresponding to a subset of the passcode characters) may be sufficient to unlock the device. As described above, it may be more difficult to provide touch input while the user is walking, jogging, bicycling, driving, etc., and thus allowing the user to unlock the device using fewer gestures in such a context can be quite beneficial. Thus, if the electronic device is determined to be in motion, as determined at decision 1614, and if the touch input is the sequence of single-tap gestures corresponding to selection of the subset of the passcode characters, the unlock function can be performed at step 1618.

In some embodiments, one or more of step 1606, decision, 1608, and decision 1614 can be performed prior to step 1604. For instance, if it is determined that the device is in motion, the user can be prompted to select only the reduced number of passcode characters corresponding to the subset of the entire passcode. In some embodiments, however, the user may be prompted to enter the total number of passcode characters despite the fact that only a subset may be required to unlock the device if it is in motion. Further, in various embodiments, the subset can include any combination of the passcode characters. For instance, the subset can include a consecutive subset of the set of passcode characters, the first and last characters of the entire passcode, or any other suitable combination.

As described herein, embodiments of the invention can relate to an electronic device performing context-sensitive actions in response to received touch input from a user. By providing for the performance of different actions in different contexts in response to the same touch input, the functionalities of an electronic device can be expanded without requiring the device to recognize new gestures. Further, by requiring different gesture in different contexts to perform the same action, in some embodiments, convenience may be provided to users of electronic devices. For instance, when a user is walking, jogging, bicycling, driving, etc., it can be more difficult to precisely enter touch input on an electronic device as compared to when the user is stationary. Thus, by recognizing and responding to different gestures in such contexts, inadvertent touch input can be avoided and intentional touch input can be provided more easily.

As described above, certain embodiments of the invention are directed to an electronic device performing context-sensitive actions in response to touch input. For instance, some embodiments are described that provide for an electronic device performing different actions in response to receiving the same touch input in different contexts. The electronic device can display a user interface of an application, and can receive touch input in a region of thee displayed user interface. In some embodiments, the touch input can correspond to a gesture that includes a single-tap, double tap, drag, swipe, pinch, flick, rotation, or a multi-touch gesture. The electronic device can determine a context. If the context is a first context, the electronic device can perform a first action. If the context is a second context, different than the first context, the electronic device can perform a second action that is different than the first action.

In some embodiments, the first context can relate to a first mode of the application and the second context can relate to a second mode of the application. In some embodiments, the application can be a map application, the first mode of the map application can be a standard map mode, and the second mode of the application can be a navigation mode. In some embodiments, the first action can include a shift, a pan, a scroll, a zoom, and a tilt, and the second action can include a different one of the shift, the pan, the scroll, the zoom, and the tilt. In some embodiments, the first context can relate to a first representation of data displayed in the user interface, and the second context can relate to a second representation of the data displayed in the user interface. For instance, the first representation of the map data can be associated with a portrait mode of the user interface, and the second representation of data can be associated with a landscape mode of the user interface.

Certain embodiments are further described that provide for an electronic device requiring different touch input in different contexts to perform the same action. An electronic device can display a user interface of an application, and touch input can be received in a region of the displayed user interface. The electronic device can determine a context. If the context is a first context, the electronic device can perform an action if the touch input is a first touch input. If the context is a second context different from the first context, the electronic device can perform the action if the touch input is a second touch input that is different from the first touch input.

In some embodiments, the touch input can correspond to one or more gestures. In some embodiments, the determined context can relate to a motion of the electronic device. For instance, the motion of the electronic device can be determined based upon sensor data provided by a sensor device of the electronic device. The sensor device can include an accelerometer or location determination circuitry. In some embodiments, the first touch input can include a swipe gesture corresponding to a first length in the region of the displayed user interface, and the second touch input can include a swipe gesture corresponding to a second length in the region of the displayed user interface that is longer than the first length. In some embodiments, the second touch input can include a selection of a confirmation element displayed in the user interface. In some embodiments, the first touch input can correspond to a first sequence of gestures, and the second touch input can correspond to a second sequence of gestures that includes a subset of the first sequence of gestures. In some embodiments, the action can include a message deletion or an unlock function.

Figure 17:
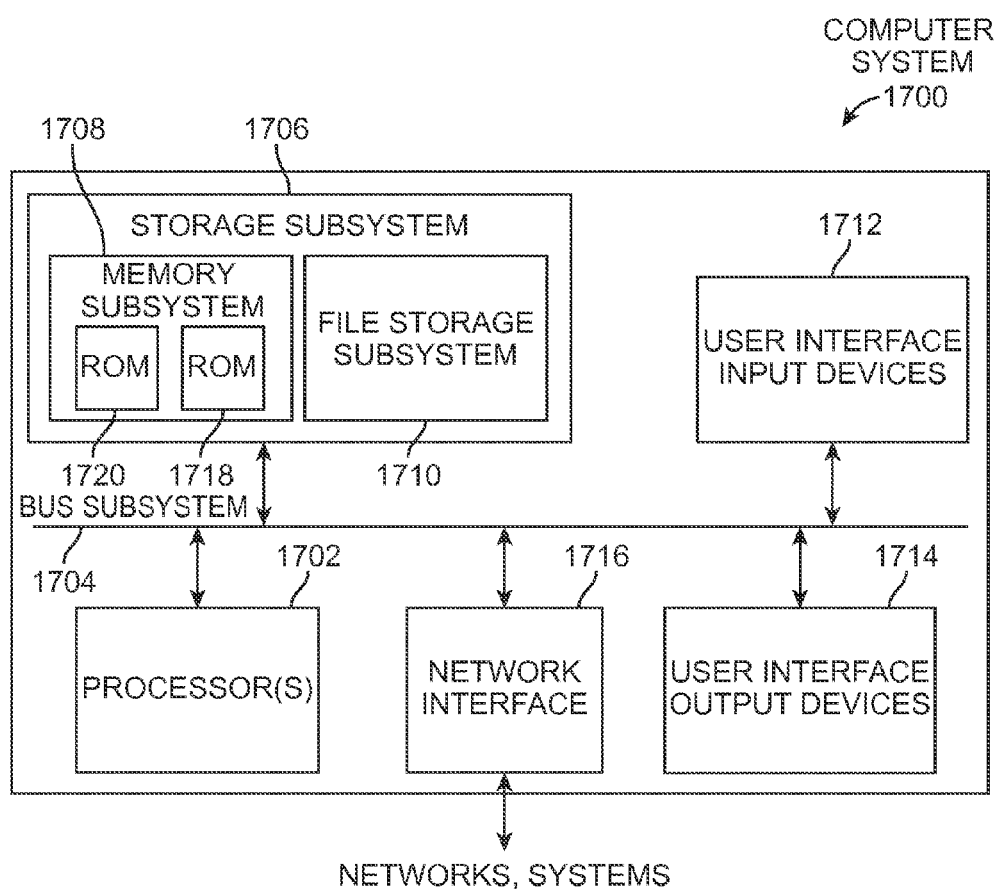
FIG. 17 depicts a simplified block diagram of a computer system that may incorporate components of a system for performing context-sensitive actions according to an embodiment of the invention.

As described above, system 1400 may incorporate embodiments of the invention. System 1400 may perform the context-sensitive actions in response to received touch input as described herein in one or more of the exemplary user interfaces discussed above with respect to FIGS. 1-13 and/or may further provide one or more of the method steps discussed above with respect to FIGS. 15-16. Moreover, system 1400 may be incorporated into various systems and devices. For instance, FIG. 17 depicts a simplified block diagram of a computer system 1700 that may incorporate components of a system for performing context-sensitive acitons in response to receive touch input according to an embodiment of the invention. As shown in FIG. 17, computer system 1700 may include one or more processors 1702 that communicate with a number of peripheral subsystems via a bus subsystem 1704. These peripheral subsystems may include a storage subsystem 1706, including a memory subsystem 1708 and a file storage subsystem 1710, user interface input devices 1712, user interface output devices 1714, and a network interface subsystem 1716.

Bus subsystem 1704 provides a mechanism for letting the various components and subsystems of computer system 1700 communicate with each other as intended. Although bus subsystem 1704 is shown schematically as a single bus, alternative embodiments of the bus subsystem may utilize multiple busses.

Processor 1702, which can be implemented as one or more integrated circuits (e.g., a conventional microprocessor or microcontroller), controls the operation of computer system 1700. One or more processors 1702 may be provided. These processors may include single core or multi-core processors. In various embodiments, processor 1702 can execute a variety of programs in response to program code and can maintain multiple concurrently executing programs or processes. At any given time, some or all of the program code to be executed can be resident in processor(s) 1702 and/or in storage subsystem 1706. Through suitable programming, processor(s) 1702 can provide various functionalities described above.

Network interface subsystem 1716 provides an interface to other computer systems and networks. Network interface subsystem 1716 serves as an interface for receiving data from and transmitting data to other systems from computer system 1700. For example, network interface subsystem 1716 may enable computer system 1700 to connect to one or more devices via the Internet. In some embodiments network interface 1716 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments network interface 1716 can provide wired network connectivity (e.g., Ethernet) in addition to or instead of a wireless interface.

User interface input devices 1712 may include a keyboard, pointing devices such as a mouse or trackball, a touchpad or touch screen incorporated into a display, a scroll wheel, a click wheel, a dial, a button, a switch, a keypad, audio input devices such as voice recognition systems, microphones, and other types of input devices. In general, use of the term "input device" is intended to include all possible types of devices and mechanisms for inputting information to computer system 1700. For example, in an iPhone®, user input devices 1712 may include one or more buttons provided by the iPhone®, a touch screen, which may display a software keyboard, and the like.

User interface output devices 1714 may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 1700. For example, a software keyboard may be displayed using a flat-panel screen.

Storage subsystem 1706 provides a computer-readable storage medium for storing the basic programming and data constructs that provide the functionality of some embodiments. Storage subsystem 1706 can be implemented, e.g., using disk, flash memory, or any other storage media in any combination, and can include volatile and/or non-volatile storage as desired. Software (programs, code modules, instructions) that when executed by a processor provide the functionality described above may be stored in storage subsystem 1706. These software modules or instructions may be executed by processor(s) 1702. Storage subsystem 1706 may also provide a repository for storing data used in accordance with the present invention. Storage subsystem 1706 may include memory subsystem 1708 and file/disk storage subsystem 1710.

Memory subsystem 1708 may include a number of memories including a main random access memory (RAM)

1718 for storage of instructions and data during program execution and a read only memory (ROM) 1720 in which fixed instructions are stored. File storage subsystem 1710 provides persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Computer system 1700 can be of various types including a personal computer, a portable device (e.g., an iPhone®, an iPad®), a workstation, a network computer, a mainframe, a kiosk, a server or any other data processing system. Due to the ever-changing nature of computers and networks, the description of computer system 1700 depicted in FIG. 17 is intended only as a specific example. Many other configurations having more or fewer components than the system depicted in FIG. 17 are possible.

Various embodiments described above can be realized using any combination of dedicated components and/or programmable processors and/or other programmable devices. The various embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A method comprising:
   at an electronic device with a touchscreen display:
   displaying, by the touchscreen display, a user interface of a map application that has a standard map mode and a navigation mode;
   receiving, by the touchscreen display, a first touch input in a map shown in the displayed user interface; and,
   in response to receiving the first touch input, modifying the user interface in accordance with the first touch input, wherein:
   in accordance with a determination that the device was operating in the standard map mode of the map application when the first touch input was received, modifying the user interface in accordance with the first touch input includes performing, by the electronic device, a first user interface action, wherein in the standard map mode, the user interface of the map application displays a representation of a map; and
   in accordance with a determination that the device was operating in the navigation mode of the map application when the first touch input was received, modifying the user interface in accordance with the first touch input includes performing, by the electronic device, a second user interface action that is different from the first user interface action, wherein in the navigation mode, the user interface of the map application displays routing information on the representation of the map.

2. The method of claim 1, wherein the first touch input corresponds to a gesture that includes a single-tap, double-tap, drag, swipe, pinch, flick, rotation, or a multi-touch gesture.

3. The method of claim 1, wherein the first user interface action includes one of a shift, a pan, a scroll, a zoom, and a tilt, and wherein the second user interface action includes a different one of the shift, the pan, the scroll, the zoom, and the tilt.

4. The method of claim 1, wherein:
   the first touch input is a drag gesture,
   the first user interface action translates the representation of the map, and
   the second user interface action rotates the representation of the map.

5. The method of claim 4, wherein the representation of the map rotates about a current location identifier.

6. The method of claim 4, wherein rotating the representation of the map simulates looking left or right in a virtual sense while maintaining display of a current location identifier and a route on the representation of the map.

7. The method of claim 4, wherein the drag gesture is made with a contact and the method includes:
   undoing the rotation of the representation of the map in response to detecting removal of the contact.

8. The method of claim 4, including:
   undoing the rotation of the representation of the map in response to expiration of a predetermined period of time.

9. A non-transitory computer readable storage medium encoded with instructions that, when executed by an electronic device with a touchscreen display, cause the electronic device to:
   display, by the touchscreen display, a user interface of a map application that has a standard map mode and a navigation mode;
   receive, by the touchscreen display, a first touch input in a map shown in the displayed user interface; and,
   in response to receiving the first touch input, modify the user interface in accordance with the first touch input, wherein:
   in accordance with a determination that the device was operating in the standard map mode of the map application when the first touch input was received, modifying the user interface in accordance with the first touch input includes performing, by the electronic device, a first user interface action, wherein in the standard map mode, the user interface of the map application displays a representation of a map; and
   in accordance with a determination that the device was operating in the navigation mode of the map application when the first touch input was received, modifying the user interface in accordance with the first touch input includes performing, by the electronic device, a second user interface action that is different from the first user interface action, wherein in the navigation mode, the user interface of the map application displays routing information on the representation of the map.

10. The computer readable storage medium of claim 9, wherein the first touch input corresponds to a gesture that includes a single-tap, double-tap, drag, swipe, pinch, flick, rotation, or a multi-touch gesture.

11. The computer readable storage medium of claim 9, wherein the first user interface action includes one of a shift, a pan, a scroll, a zoom, and a tilt, and wherein the second user interface action includes a different one of the shift, the pan, the scroll, the zoom, and the tilt.

12. The computer readable storage medium of claim 9, wherein:
the first touch input is a drag gesture,
the first user interface action translates the representation of the map, and
the second user interface action rotates the representation of the map.

13. The computer readable storage medium of claim 12, wherein the representation of the map rotates about a current location identifier.

14. The computer readable storage medium of claim 12, wherein rotating the representation of the map simulates looking left or right in a virtual sense while maintaining display of a current location identifier and a route on the representation of the map.

15. The computer readable storage medium of claim 12, wherein the drag gesture is made with a contact and,
the instructions include instructions that, when executed by the electronic device, cause the electronic device to undo the rotation of the representation of the map in response to detecting removal of the contact.

16. The computer readable storage medium of claim 15, including instructions that, when executed by the electronic device, cause the electronic device to undo the rotation of the representation of the map in response to expiration of a predetermined period of time.

17. An electronic device, comprising:
a touchscreen display;
one or more processors;
memory; and
one or more programs, wherein the one or more programs are stored in the memory and configured to be executed by the one or more processors, the one or more programs including instructions for:
displaying, by the touchscreen display, a user interface of a map application that has a standard map mode and a navigation mode;
receiving, by the touchscreen display, a first touch input in a map shown in the displayed user interface; and,
in response to receiving the first touch input, modifying the user interface in accordance with the first touch input, wherein:
in accordance with a determination that the device was operating in the standard map mode of the map application when the first touch input was received, modifying the user interface in accordance with the first touch input includes performing, by the electronic device, a first user interface action, wherein in the standard map mode, the user interface of the map application displays a representation of a map; and
in accordance with a determination that the device was operating in the navigation mode of the map application when the first touch input was received, modifying the user interface in accordance with the first touch input includes performing, by the electronic device, a second user interface action that is different from the first user interface action, wherein in the navigation mode, the user interface of the map application displays routing information on the representation of the map.

18. The electronic device of claim 17, wherein the first touch input corresponds to a gesture that includes a single-tap, double-tap, drag, swipe, pinch, flick, rotation, or a multi-touch gesture.

19. The electronic device of claim 17, wherein the first user interface action includes one of a shift, a pan, a scroll, a zoom, and a tilt, and wherein the second user interface action includes a different one of the shift, the pan, the scroll, the zoom, and the tilt.

20. The electronic device of claim 17, wherein:
the first touch input is a drag gesture,
the first user interface action translates the representation of the map, and
the second user interface action rotates the representation of the map.

21. The electronic device of claim 20, wherein the representation of the map rotates about a current location identifier.

22. The electronic device of claim 20, wherein rotating the representation of the map simulates looking left or right in a virtual sense while maintaining display of a current location identifier and a route on the representation of the map.

23. The electronic device of claim 20, wherein the drag gesture is made with a contact and the one or more programs include instructions for:
undoing the rotation of the representation of the map in response to detecting removal of the contact.

24. The electronic device of claim 20, wherein the one or more programs include instructions for:
undoing the rotation of the representation of the map in response to expiration of a predetermined period of time.

25. The method of claim 1, including:
after modifying the user interface in accordance with the first input, detecting an end of the first touch input; and,
in response to detecting the end of the first touch input:
in accordance with a determination that the device was operating in the standard map mode of the map application when the first touch input ended, maintaining the user interface as modified in accordance with the first input; and
in accordance with a determination that the device was operating in the navigation mode of the map application when the first touch input ended, reverting the user interface back to the appearance of the user interface prior to being modified in accordance with the first input.

26. The method of claim 1, wherein modifying the user interface in accordance with the first touch input includes changing the displayed representation of the map.

27. The method of claim 26, wherein changing the displayed representation of the map includes changing the displayed representation of the map based on an amount of movement in the first touch input.

28. The non-transitory computer readable storage medium of claim 9, including instructions that, when executed by the electronic device, cause the electronic device to:

after modifying the user interface in accordance with the first input, detect an end of the first touch input; and,
in response to detecting the end of the first touch input:
    in accordance with a determination that the device was operating in the standard map mode of the map application when the first touch input ended, maintain the user interface as modified in accordance with the first input; and
    in accordance with a determination that the device was operating in the navigation mode of the map application when the first touch input ended, revert the user interface back to the appearance of the user interface prior to being modified in accordance with the first input.

29. The non-transitory computer readable storage medium of claim 9, wherein modifying the user interface in accordance with the first touch input includes changing the displayed representation of the map.

30. The non-transitory computer readable storage medium of claim 29, wherein changing the displayed representation of the map includes changing the displayed representation of the map based on an amount of movement in the first touch input.

31. The electronic device of claim 17, wherein the one or more programs include instructions for:
after modifying the user interface in accordance with the first input, detecting an end of the first touch input; and,
in response to detecting the end of the first touch input:
    in accordance with a determination that the device was operating in the standard map mode of the map application when the first touch input ended, maintaining the user interface as modified in accordance with the first input; and
    in accordance with a determination that the device was operating in the navigation mode of the map application when the first touch input ended, reverting the user interface back to the appearance of the user interface prior to being modified in accordance with the first input.

32. The electronic device of claim 17, wherein modifying the user interface in accordance with the first touch input includes changing the displayed representation of the map.

33. The electronic device of claim 32, wherein changing the displayed representation of the map includes changing the displayed representation of the map based on an amount of movement in the first touch input.

\* \* \* \* \*